US005695645A

United States Patent [19]
Bober et al.

[11] Patent Number: 5,695,645
[45] Date of Patent: Dec. 9, 1997

[54] METHODS FOR REMOVING SILVER FROM SPENT PHOTOPROCESSING SOLUTION

[75] Inventors: Thomas W. Bober, Rochester; Terry W. Pearl, Waterloo; Dominick Vacco, Rochester; David C. Yeaw, Brockport, all of N.Y.

[73] Assignee: Eastman Kodak Company, Rochester, N.Y.

[21] Appl. No.: 649,415

[22] Filed: May 16, 1996

Related U.S. Application Data

[63] Continuation-in-part of Ser. No. 206,355, Mar. 4, 1994, Pat. No. 5,549,820.

[51] Int. Cl.$^6$ .................................................. C02F 1/56
[52] U.S. Cl. .......................... 210/710; 75/417; 75/635; 75/713; 75/722; 75/723; 210/715; 210/727; 210/738; 210/803; 210/804; 210/912
[58] Field of Search ........................... 210/702, 710, 210/715, 725, 727, 728, 738, 803, 804, 912, 199, 202, 205–208, 295, 299, 311–313, 319, 244, 320, 493.1, 493.5, 257.1, 262; 75/417, 635, 713, 722, 723

[56] References Cited

U.S. PATENT DOCUMENTS

| | | | |
|---|---|---|---|
| Re. 32,788 | 11/1988 | Disanza | 55/429 |
| 323,637 | 8/1885 | Connolly . | |
| 584,406 | 6/1897 | Rowan . | |
| 604,450 | 5/1898 | White . | |
| 646,537 | 4/1900 | Field . | |
| 845,520 | 2/1907 | Callow . | |
| 908,308 | 12/1908 | Mueller . | |
| 982,704 | 1/1911 | Bull . | |
| 1,040,283 | 10/1912 | Crum . | |
| 1,149,750 | 8/1915 | Greth | 210/202 |
| 1,339,682 | 5/1920 | Allen . | |
| 1,362,611 | 12/1920 | Ellms . | |
| 1,446,056 | 2/1923 | Misener . | |
| 1,468,906 | 9/1923 | Inman . | |
| 1,579,205 | 4/1926 | Blakesley et al. . | |
| 1,605,596 | 11/1926 | Langelier . | |
| 1,623,437 | 4/1927 | Pohle . | |
| 1,753,577 | 4/1930 | Piccardo . | |
| 1,810,965 | 6/1931 | Hopkins . | |

(List continued on next page.)

FOREIGN PATENT DOCUMENTS

| | | |
|---|---|---|
| 578852 | 1/1994 | European Pat. Off. . |
| 2571354 | 4/1986 | France . |
| 2331242 | 1/1975 | Germany . |
| 2129549 | 11/1983 | United Kingdom . |

OTHER PUBLICATIONS

"The Filter Press for the Filteration of insoluble Photographic Processing Wastes," Thomas W. Bober and Austin C. Cooley, Mar.–Apr., 1972; *Photographic Science and Engineering*, vol. 16, No. 2.

"Silver Recovery from Photographic Waste Processing solutions by Using Trisodium Salt of 2,4,6–Trimercapto–S–Triazine," Nate Spears and Bob Sentell, 3–5 Feb. 1992.

"Silver Recovery for Environmental Compliance Part 3: Precipitation and Other Methods," Austin C. Coley, *Photo Lab Management*, Mar. 1993.

*Primary Examiner*—Peter A. Hruskoci
*Attorney, Agent, or Firm*—Charles E. Snee, III

[57] ABSTRACT

Spent solutions from photographic processors are fed into a conduit (18) to which subsequently are added precipitating agents from a first source (22) and flocculating agents from a second source (28); so that, well grown or ripened clumps of flocculated solids are formed along the conduit before being emptied into a gravity collecting vessel and shipping container (38) from which clarified liquids are displaced by a mass (50) of accumulated flocculated solids, typically through a filter (58, 142, 150, 158, 162, 166, 220)for removal of any unsettled fines. Many of the clumps of flocculated solids become enlarged enough to individually extend across and substantially fill a cross-sectional area of the conduit. As a result, the enlarged clumps substantially block passage of and strain from the solution remaining fine particles which then adhere to the clumps.

22 Claims, 15 Drawing Sheets

U.S. PATENT DOCUMENTS

| | | | |
|---|---|---|---|
| 1,822,440 | 9/1931 | Jacobson. | |
| 1,874,002 | 8/1932 | Fantz. | |
| 2,100,951 | 11/1937 | Glass et al. | 210/183 |
| 2,190,596 | 2/1940 | Dorr | 210/738 |
| 2,289,669 | 7/1942 | Maxton | 210/738 |
| 2,326,691 | 8/1943 | Schum | 210/165 |
| 2,382,490 | 8/1945 | Lawlor | 210/202 |
| 2,413,375 | 12/1946 | Pomeroy | 210/738 |
| 2,453,895 | 11/1948 | Corwin | 210/165 |
| 2,467,408 | 4/1949 | Semon | 183/73 |
| 2,503,566 | 4/1950 | Scott | 210/165 |
| 2,634,862 | 4/1953 | Smith | 210/311 |
| 2,754,969 | 7/1956 | Petersen | 210/57 |
| 2,934,791 | 5/1960 | Kasten et al. | 210/493.1 |
| 3,051,453 | 8/1962 | Sluijters | 259/4 |
| 3,523,889 | 8/1970 | Eis | 210/715 |
| 3,575,853 | 4/1971 | Gaughan et al. | 210/205 |
| 3,652,061 | 3/1972 | Chisholm | 259/4 |
| 3,664,638 | 5/1972 | Grout et al. | 259/4 |
| 3,716,485 | 2/1973 | Robertson | 210/721 |
| 3,740,363 | 6/1973 | Fuller | 210/713 |
| 3,771,664 | 11/1973 | Schrink et al. | 210/448 |
| 3,774,768 | 11/1973 | Turner | 210/199 |
| 3,778,368 | 12/1973 | Nakamura et al. | 210/54 |
| 3,789,989 | 2/1974 | Carson | 210/284 |
| 3,814,261 | 6/1974 | Morgan | 210/453 |
| 3,832,453 | 8/1974 | Slovonsky et al. | 423/561 |
| 3,844,946 | 10/1974 | Farrell | 210/104 |
| 3,923,288 | 12/1975 | King | 259/4 |
| 3,933,642 | 1/1976 | Wilson | 210/206 |
| 4,034,965 | 7/1977 | King | 259/448 |
| 4,046,684 | 9/1977 | Tsunoda et al. | 210/715 |
| 4,110,209 | 8/1978 | Vogel | 210/44 |
| 4,132,643 | 1/1979 | Hellquist | 210/84 |
| 4,165,360 | 8/1979 | Casper et al. | 422/202 |
| 4,279,644 | 7/1981 | Friar et al. | 75/118 P |
| 4,295,973 | 10/1981 | Jain | 210/738 |
| 4,347,141 | 8/1982 | Rothberg | 210/721 |
| 4,348,279 | 9/1982 | Tikhonov et al. | 210/96.1 |
| 4,404,105 | 9/1983 | Rysman de Lockerente et al. | 210/710 |
| 4,465,597 | 8/1984 | Herman et al. | 210/713 |
| 4,508,838 | 4/1985 | Buckl | 502/62 |
| 4,511,258 | 4/1985 | Federighi et al. | 366/337 |
| 4,692,030 | 9/1987 | Tauscher et al. | 366/337 |
| 4,731,187 | 3/1988 | Moriya et al. | 210/719 |
| 4,765,908 | 8/1988 | Monick et al. | 210/666 |
| 4,812,046 | 3/1989 | Henderickson | 366/111 |
| 4,822,496 | 4/1989 | Griffiths et al. | 210/721 |
| 4,936,689 | 6/1990 | Federighi et al. | 366/337 |
| 4,959,122 | 9/1990 | Kurematsu et al. | 159/42 |
| 4,999,114 | 3/1991 | Choo | 210/709 |
| 5,093,008 | 3/1992 | Clifford | 210/199 |
| 5,102,545 | 4/1992 | Hoffman | 210/493.1 |
| 5,120,449 | 6/1992 | Guillerme et al. | 210/725 |
| 5,132,022 | 7/1992 | Woog | 210/719 |
| 5,221,470 | 6/1993 | McKinney | 210/151 |
| 5,238,579 | 8/1993 | Shibley | 210/716 |

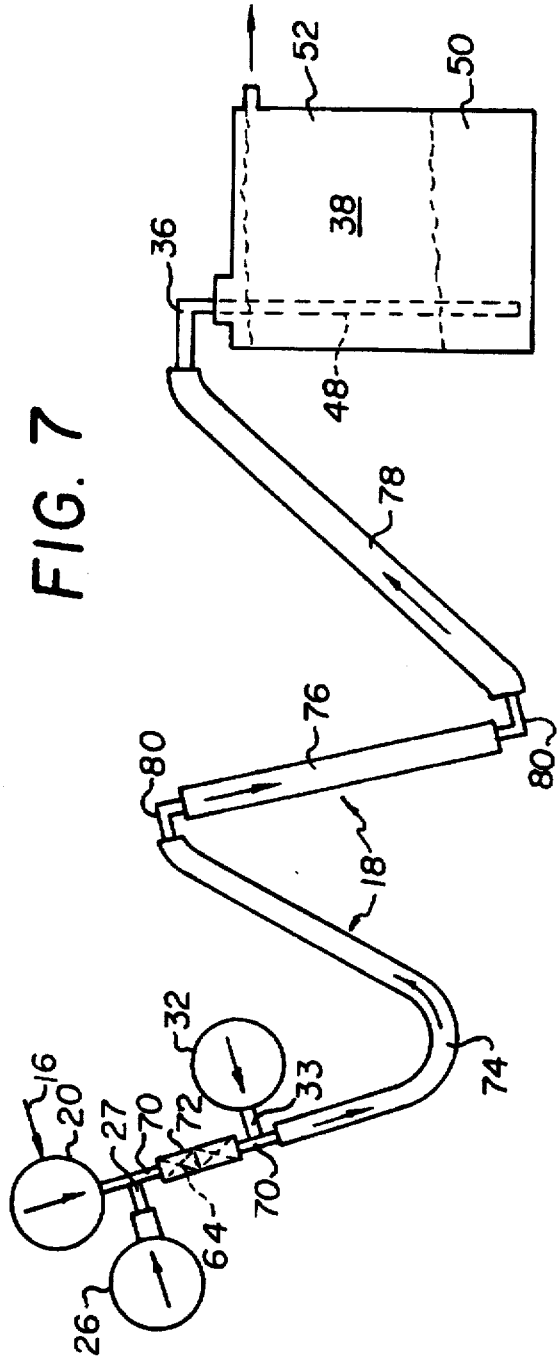
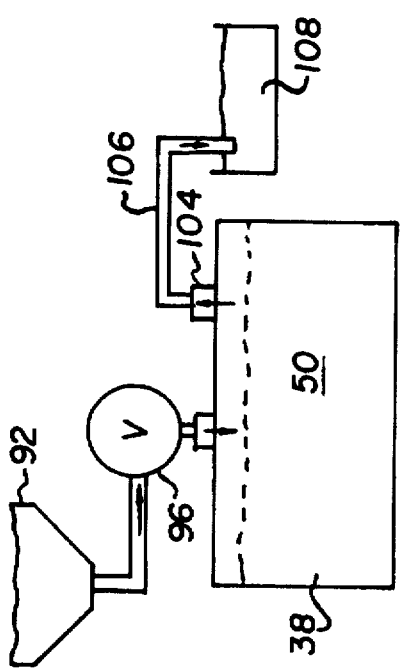
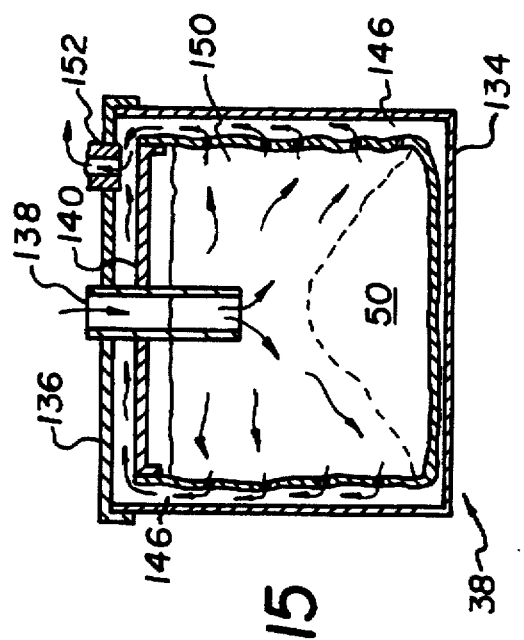

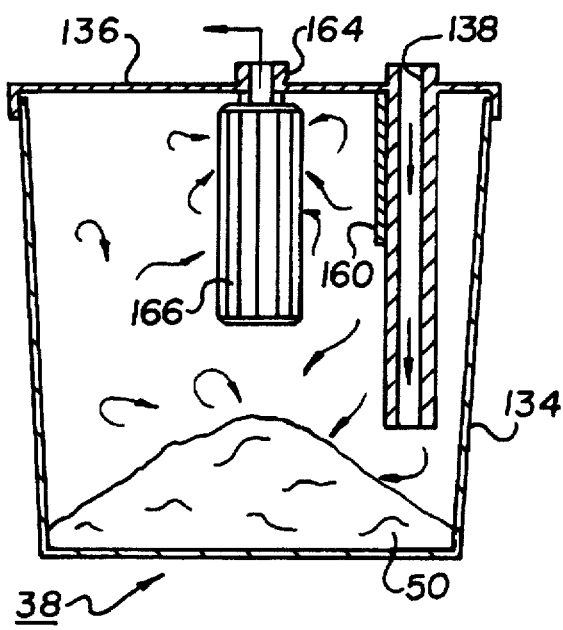
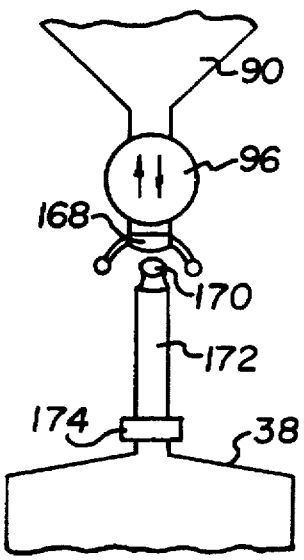
FIG. 20
FIG. 21
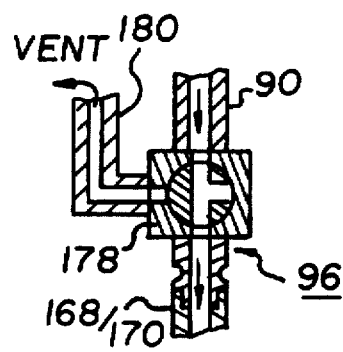
FIG. 23
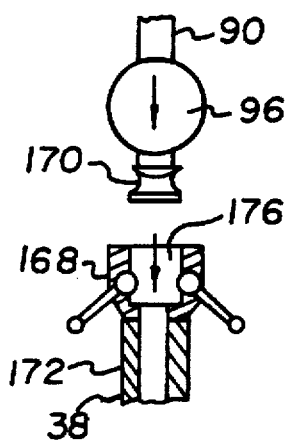
FIG. 22
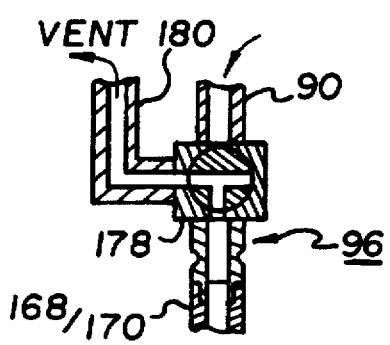
FIG. 24

METHODS FOR REMOVING SILVER FROM SPENT PHOTOPROCESSING SOLUTION

CROSS REFERENCE TO RELATED APPLICATION

This application is a continuation-in-part of Ser. No. 08/206,355 filed Mar. 4, 1994, now U.S. Pat. No. 5,549,820.

TECHNICAL FIELD

The invention concerns apparatus and methods for removing unwanted or valuable components from solutions. More particularly, the invention relates to removal of silver from spent solutions used to process or develop photographic film.

BACKGROUND ART

Processing or developing photographic film and paper products and other imaging products requires the use of a variety of known types of processing solutions. During use, the processing solutions gradually lose their effectiveness and must be replaced with fresh solutions. Photographic processors and film manufacturers for many years have been concerned with how to properly dispose of the spent or waste solutions. The spent solutions may contain precious metals such as silver which often have been recovered as an economic measure. Also, government regulations on discharge to the environment of solutions containing such metals typically have required that virtually all of the metals be removed before the remaining liquid may be discharged to the sewer. For example, many state or local regulations in the United States restrict the silver content of liquid discharged to a sewer, typically to a range of 1 to 12.5 parts per million (mg/L) of solution.

Certain ingredients in such spent solutions have been reacted with precipitating and flocculating agents to form solid precipitates containing the metal or other ingredient to be removed. The precipitates have been filtered from the solution and the remaining liquid has been discharged. Some film processors have separated the precipitates by centrifuging. Others have separated the precipitates by simple settling and decanting. Various techniques of these sorts are described in commonly assigned U.S. Pat. No. 3,832,453 and by Thomas W. Bober and Austin C. Cooley in "The Filter Press for Filtration of Insoluble Photographic Processing Wastes," *Photographic Science and Engineering*, Vol. 16, No. 2, March-April 1972.

More recently, recovery of silver from spent solutions has been made simpler due to introduction of metal salts, most commonly the trisodium salt of trimercapto-S-triazine or TMT, as the metal precipitating agent. Other cationic salts of TMT also can be used as precipitating agents, such as the potassium, ammonium or lithium salt. TMT can be used for primary or secondary recovery of silver; however, many film processors have reported that TMT is very useful and most economical for secondary treatment of spent solutions which have previously had most of the silver removed by conventional methods such as electrolysis, for example. In one known method, the spent solution and TMT were mechanically mixed for as long as an hour in a large settling vessel, typically a round-bottomed or cone-bottomed vessel. The resultant mixture was left to settle overnight or for as long as twenty hours. Then, much of the liquid above the settled solids was decanted and the settled solids were passed out of the bottom of the vessel into a bag filter. Some work has been reported in the literature in which a polymeric flocculant has been added to the mixture prior to settling. Methods of the latter type were described by Nathan Spears and Robert Sentell in a paper entitled "Silver Recovery from Photographic Waste Processing Solutions by Using the Trisodium Salt of 2,4,6-Trimercapto-S-Triazine," presented at the Seventh International Symposium on Photofinishing Technology in San Francisco, Calif., 3 to 5 Feb. 1992.

Those skilled in the photographic processing technologies will understand that various other types of components have been removed from spent processing solutions by precipitation, such as Prussian blue (iron ferrocyanide), calcium sulfate, various coupling agents, chromium hydroxide from bleach and systems cleaners, aluminum salts and many others. Some of these precipitated materials tend to form rather gelatinous solids that will quickly clog or blind most filters. Others produce a very large mount of suspended fine particles that tend to remain suspended in the liquid even after rather long settling times.

While such known methods for removing components from waste photo-processing solutions have proven relatively effective at recovery of precipitated solids, a number of problems have remained. Considerable care has been required when decanting the last portions of the liquid in the zone closest to the settled solids in the bottom of the settling vessel, since the solids tend to stir up and carry out with the liquid, potentially requiring a further filtering operation or return of the liquid and fines from that zone to the vessel for processing with the next batch of spent solutions.

Another problem may exist when solids already settled on the bottom of the settling vessel are disturbed when a valve is opened at the bottom of the vessel to dump the moist solids for further processing. If no liquid remains in the vessel when the valve is opened, difficulty may be encountered with getting the settled solids to flow completely out of the vessel without subsequent scraping or other manual handling. So, enough liquid often has been left in the vessel to permit the solids to be discharged as a slurry for easy conveyance.

Similarly, there may occur times when it is desired to remove solids from the settling vessel while a considerable volume of liquid remains above the settled solids. In such situations, when the solids are disturbed by opening the bottom valve, some solids, particularly fines, are stirred up and resuspended in the liquid layer for a considerable period of time until the entire contents of the vessel are quiescent for a long enough period to allow the fines to settle again. But, if the liquid must be decanted before the fines have resettled, the fines are carried out and a further filtering may be needed to achieve the desired level of purity of the discharged liquid.

Various types of apparatus and methods are known for removing contaminants from solutions such as waste water. However, the present inventors' experience indicates that using such known apparatus and methods for removal of silver from spent photoprocessing solutions would be expected to produce effluents having silver concentrations far exceeding requirements of current government regulations. An example of such known apparatus is found in U.S. Pat. No. 3,933,642 which discloses a coiled tubular reactor for treating waste water solely by flocculation. The patent teaches a number of physical relationships said to be required for a "decayed gradient flocculation" which is carried out in very large scale waste water treatment installations. For flow rates and tubing diameters described in the patent, Reynolds numbers ($N_{Re}$) were calculated by the present inventors to be in excess of 50,000 using the conventional formula $D v \rho / \mu$, where D is pipe diameter, v is flow velocity, $\rho$ is fluid specific gravity and $\mu$ is fluid viscosity. As will be shown later in the present specification, the flow regimes described in the patent produce $N_{Re}$ well beyond a desired maximum of about 4,000 experienced with embodiments of the present invention in which effluent silver concentrations were maintained below the requirements of government regulations.

To assess the efficacy of the system of U.S. Pat. No. 3,933,642 for silver removal, bench-scale coiled reactors were assembled on behalf of the present inventors and tested using flow conditions ($N_{Re}$, residence times, and ratio of tubing inside diameter to coil inside diameter) comparable with those of the patent, but employing the precipitating and flocculating agents described later in the present specification. When these test reactors were operated using spent photoprocessing solutions containing silver, effluent silver concentrations exceeded those allowed by current regulations, even though for the tested reactors $N_{Re}$ was lower by nearly an order of magnitude than $N_{Re}$ calculated for the flow regimes specified by the patent. Although some small masses of flocculated particles did form in the test reactors, these masses would break up into even smaller masses when $N_{Re}$ were approached which were only one tenth the magnitude calculated for the flow regimes of the patent. As a result, many fines were carried from the test reactor and the residual silver in the effluent exceeded allowable standards. Thus, the present inventors would expect that operating at the much higher $N_{Re}$ of the flow regime specified by the patent would produce still poorer performance and would not solve the problems indicated previously.

SUMMARY OF THE INVENTION

The primary objective of the invention is to provide simple, compact and inexpensive apparatus and methods for removing a component from a solution, such as spent photo-processing solution, by treating the solution to form settleable solids, passing the solids into a collecting vessel and allowing the remaining liquid to flow from the collecting vessel.

A further objective of the invention is to provide such apparatus and methods in which the collecting vessel is readily removable and suitable for use as a shipping container to transport the solids to another location for further processing, such as to a precious metals refiner.

Another objective of the invention is to provide such apparatus and methods in which waste solutions from a film processing machine can be taken directly from the machine and treated in a reliable, repeatable manner while maintaining clean surroundings, essentially without requiring frequent intervention by the operator of the machine.

Still another objective of the invention is to provide such apparatus and methods in which removal of the collecting vessel causes minimal disturbance to the operation of the rest of the apparatus or method.

Yet another objective of the invention is to accomplish separation of solids and liquids in a controlled manner in the shortest possible time for greatest efficiency while minimizing any stirring up and resuspending of already settled solids and thus minimizing any need for additional settling time.

A still further objective of the invention is to accomplish separation of solids and liquids in a reproducible manner and to such a degree that the clarified liquid will meet regulatory requirements for discharge or will be suitable for reuse or reclamation.

Another objective of the invention is to accomplish such separation while decreasing the flow velocity of the solids and liquids as they move through the apparatus thus enhancing the tendency of the solids to agglomerate into large clumps which will settle readily.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The invention is defined by the appended claims. In a broad sense, an apparatus or method according to the invention is suited for removing silver from spent photoprocessing solutions. Means or a step is provided for combining a solution containing silver to be removed, a precipitating agent for the silver, and a flocculating agent for a precipitate formed by the solution and the precipitating agent. A conduit is provided having a length, a cross sectional area, an inlet end and an outlet end. Means or a step are provided for delivering the combined solution at a flow rate into the conduit. The length of the conduit and the flow rate through the conduit are chosen to provide a residence time sufficient for forming large, ripened clumps of flocculated particles of the precipitate. Uniquely in accordance with the invention, the residence time further is chosen to be sufficient for allowing clumps of flocculated particles to grow and agglomerate during passage through the length into enlarged, apparently porous clumps many of which individually extend across and substantially fill the cross sectional flow area, whereby the enlarged clumps substantially block passage of and strain from the solution remaining fine particles which then adhere to the enlarged clumps.

In one embodiment, the apparatus is particularly suited for continuously or intermittently removing silver from spent photoprocessing solution. Means are included for providing a solution containing silver to be removed. Conduit means define a mixing path having a cross-sectional area, an inlet end and an outlet end, for receiving and passing the solution. The mixing path may be a closed conduit such as a length of tubing through which the solution is pumped. First means, such as gravity feed or a peristaltic or bellows pump, is provided for delivering the solution into the inlet end of the mixing path. Second means, such as gravity feed or a suitable pump, is provided downstream of the first means for delivering into the conduit means a precipitating agent for the component. The spent solution and precipitating agent also may be delivered to the conduit means in the reverse order or essentially simultaneously, provided the proper ratios are maintained. In some embodiments of the invention, the spent solution and precipitating agent may be mixed in a separate vessel and the mixture delivered into the conduit means. Third means, again such as gravity feed or a suitable pump, is provided downstream of the second means for delivering into the conduit means a flocculating agent for the precipitate. The second and third means are separated by a first distance chosen to provide a first residence time sufficient for mixing of the solution and the precipitating agent and for forming a precipitate well suited for flocculation. That is, the residence time between the second and third means is long enough to enable the crystals of precipitate to grow or ripen to a point at which addition of a flocculating agent will cause formation of flocculated particles which tend to agglomerate readily into clumps. In some applications, however, the residence time for precipitation may be very short. The outlet end of the conduit means is located downstream of the third means, at a second distance chosen to provide a second residence time sufficient for forming larger, more ripened clumps of flocculated particles of the precipitate. The second residence time also is sufficient to allow the more ripened clumps to grow and agglomerate during passage through the second distance into enlarged, apparently porous clumps, many of which individually extend across and substantially fill the cross-sectional flow area. As a result, the enlarged clumps substantially block passage of and strain from the solution remaining fine particles which then adhere to the large clumps.

A collecting and shipping vessel having an inlet, releasably connected to the outlet end of the conduit means, may be provided for receiving the flocculated solids and any remaining liquid and for permitting the flocculated solids to settle to a bottom of the vessel and the remaining liquid to move toward an outlet of the vessel. As a result, the settled flocculated solids gradually will substantially fill the vessel while at least a substantial part of the remaining liquid gradually will pass from the vessel, thereby permitting a filled collecting and shipping vessel to be disconnected from the outlet end of the conduit means. The flow area of the collecting and shipping vessel preferably is substantially larger than that of the conduit means, thereby causing the solution velocity to decrease and the solids to settle more readily in the vessel. The collecting and shipping vessel may be used as a shipping container for the settled solids.

One embodiment of the method of the invention is suited for continuously or intermittently removing silver from spent photoprocessing solution. A solution containing silver to be removed is provided, either from a holding vessel or directly from a photo-processing machine. A mixing path such as an elongated tube is defined having a cross-sectional area, an inlet end and an outlet end for receiving and passing the solution; and the solution is delivered into the inlet end. Downstream of the point of delivery of the solution, a precipitating agent for the component is delivered into the mixing path. The spent solution and precipitating agent also may be mixed in a separate vessel before delivery into the elongated tube. Downstream of the point of delivery of the precipitating agent at a first distance chosen to provide a first residence time sufficient for mixing of the solution and the precipitating agent and for forming a precipitate well suited to flocculation, a flocculating agent for the precipitate is delivered into the mixing path. The outlet end of the mixing path preferably is downstream of the point of delivery of the flocculating agent at a second distance chosen to provide a second residence time sufficient for forming larger, more ripened clumps of flocculated particles of precipitate. The second residence time also is sufficient to allow the more ripened clumps to grow and agglomerate during passage through the second distance into enlarged, apparently porous clumps, many of which individually extend across and substantially fill the cross-sectional flow area. As a result, the enlarged clumps substantially block passage of and strain from the solution remaining fine particles which then adhere to the large clumps.

The flocculated solids and any remaining liquid are collected in a first collecting and shipping vessel having an inlet, releasably connected to the outlet end of the mixing path, for receiving the flocculated solids and any remaining liquid. The flocculated solids are permitted to settle to a bottom of the first vessel and the remaining liquid to move toward an outlet of the first vessel. The settled flocculated solids gradually will substantially fill the first vessel while at least a substantial part of the remaining liquid gradually will pass through the outlet from the first vessel, thereby permitting a filled first vessel to be disconnected from the outlet end of the mixing path. When the first vessel has filled, it is removed from communication with the outlet end; and a second, empty vessel is connected to the outlet end of the mixing path.

In the previously described apparatus and method of the invention, the conduit means may increase in flow area from the inlet end to the outlet end to thereby decrease the flow velocity of the flocculated solids and enhance their tendency to agglomerate and separate from the liquid. An intermediate settling vessel may be provided for receiving the flocculated solids and any remaining liquid from the conduit means, the settling vessel having a sloped bottom wall and a bottom outlet for liquid and flocculated solids, the collecting vessel being releasably connected to the bottom outlet of the settling vessel. The settling vessel has a cross section and may comprise an internal baffle wall extended across a chord of the cross section, the baffle wall having a lower edge near the sloped bottom wall and the conduit means extending into the settling vessel on one side of the baffle wall; and an outlet for clarified liquid on an opposite side of the baffle wall near an upper end of the settling vessel. In some applications where fine particles of precipitate do not settle from the settling vessel into the collecting vessel, a further collecting vessel may be connected to this outlet for clarified liquid, to remove such fines. The conduit means may include static mixing elements between the second and third means for delivering. Optionally, static mixing elements may be included downstream of the third means for delivering. The conduit means may be curved into a flat coil, a helix, a spiral, a flattened helix or spiral, undulating pattern or other regular or irregular patterns.

A further embodiment of the apparatus of the invention includes means for providing a spent photoprocessing solution containing silver to be removed; a mixing vessel; and first means for delivering the solution into the mixing vessel. Second means are provided for delivering a precipitating agent for the silver into the mixing vessel. Third means are provided for delivering a flocculating agent for the precipitate into the mixing vessel, whereby flocculated solids are formed by the precipitate and the flocculating agent. A settling vessel is included for receiving flocculated solids and any remaining liquid from the mixing vessel, the settling vessel preferably having a sloped bottom wall and a bottom outlet for liquid and flocculated solids. An internal baffle wall is extended across a chord of the settling vessel, with the baffle wall extending from an upper end of the settling vessel downward to near the sloped bottom wall, thereby defining an inlet passage on one side of the baffle wall within the settling vessel, the inlet passage having a length sufficient to provide adequate residence time for formation and some ripening of clumps of the flocculated solids. The inlet passage also may be defined by a downwardly extending conduit or nest of conduits within the settling vessel, rather than by a baffle wall. An outlet for clarified liquid is provided on an opposite side of the baffle wall near an upper end of the settling vessel. Fourth means are provided for delivering flocculated solids and liquid from the mixing vessel into the inlet passage.

A collecting and shipping vessel having an inlet, releasably connected to the bottom outlet of the settling vessel, preferably is provided for continuously or intermittently receiving the flocculated solids and any remaining liquid, for permitting the flocculated solids to settle to a bottom of the collecting and shipping vessel and the remaining liquid to move toward an outlet of the collecting and shipping vessel, whereby the settled flocculated solids gradually will fill substantially the collecting and shipping vessel while at least a substantial part of the remaining liquid gradually will pass from the vessel, thereby permitting a filled collecting and shipping vessel to be disconnected from the bottom outlet of the settling vessel.

A further embodiment of the method of the invention may include the steps of providing a spent photoprocessing solution containing silver to be removed; providing a mixing vessel; delivering the solution into the mixing vessel; delivering a precipitating agent for the silver into the mixing vessel; delivering a flocculating agent for the precipitate into the mixing vessel, whereby flocculated solids are formed by the precipitate and the flocculating agent; providing a settling vessel for receiving flocculated solids and any remaining liquid from the mixing vessel, the settling vessel preferably having a sloped bottom wall and a bottom outlet for liquid and flocculated solids; providing an internal baffle wall extended across a chord of the settling vessel from an upper end of the settling vessel downward to near the sloped bottom wall, thereby defining an inlet passage on one side of the baffle wall within the settling vessel, the inlet passage having a length sufficient to provide adequate residence time for formation and some ripening of clumps of the flocculated solids.

The method further comprises providing an outlet for clarified liquid on an opposite side of the baffle near an upper end of the settling vessel; delivering flocculated solids and liquid from the mixing vessel into the inlet passage; delivering flocculated solids and liquid from the settling vessel into a first shipping and collecting vessel having an inlet, releasably connected to the bottom outlet of the settling vessel, for receiving the flocculated solids and any remaining liquid; permitting the flocculated solids to settle to a bottom of the collecting and shipping vessel and the remaining liquid to move toward an outlet of the collecting and shipping vessel, whereby the settled flocculated solids gradually will fill substantially the collecting and shipping vessel while at least a substantial part of the remaining liquid gradually will pass from the collecting and shipping vessel, thereby permitting a filled collecting and shipping vessel to be disconnected from the bottom outlet of the settling vessel; removing the first collecting and shipping vessel when it is filled; and connecting a second, empty collecting and shipping vessel to the outlet of the mixing path.

In any of the previously described apparatus and methods of the invention, the outlet of the collecting and shipping vessel may be above the bottom of the vessel; and the flocculated solids and any remaining liquid may flow into the vessel near the bottom of the vessel, whereby any remaining liquid flows upward through previously settled solids, thereby removing fines before the liquid reaches the outlet of the vessel. By "near the bottom of the vessel" is meant that flocculated solids and liquid are flowed into the collecting and shipping vessel close enough to the bottom to avoid undue breaking up of the clumps entering or already resting in the vessel or excessive stirring up of fines. The clearance to the bottom of the vessel may be adjusted depending on the spent solution being treated. The collecting and shipping vessel may comprise a filter for removing fines from liquid flowing through the outlet of the collecting and shipping vessel. The filter may be a porous bag suspended within the collecting vessel, the flocculated solids being captured within the bag. When a filter bag is used, the primary mode of separation is settling within the bag; the secondary mode of separation is filtration through the bag; and the tertiary mode is wicking of liquid by the bag. When the outlet from the collecting vessel is located above the bottom of the vessel, the filter may comprise an annular ring of filter material supported at the level of the outlet; and the inlet of the collecting vessel may open inside the annular ring, whereby flocculated solids settle to the bottom of the collecting vessel and remaining liquid eventually rises to flow through the annular ring to the outlet.

Also in any of the previously described apparatus and method of the invention, the flocculated solids and any remaining liquid flow into the collecting and shipping vessel near the bottom of the vessel, whereby any remaining liquid must flow upward through previously settled solids, thereby removing fines from the liquid; a filter element is positioned within the collecting vessel, the filter element dividing the interior of collecting vessel into a first chamber for receiving flocculated solids and liquid and a second chamber for receiving liquid passed through the filter element; and the outlet of the collecting and shipping vessel is connected to the second chamber. Preferably, the first chamber is substantially larger in volume than the second chamber. The filter element may extend upward from the bottom of the collecting and shipping vessel and may be tubular; and the second chamber may be surrounded by the filter element. The filter element may be tubular and the first chamber may be defined within the filter element. The filter element may be tubular and the second chamber may be defined within the filter element.

In accordance with a further aspect of the invention, an apparatus for collecting and separating flocculated solids and liquid may include a collecting and shipping vessel having an interior and a bottom; an inlet for flocculated solids and liquid to flow into the vessel near the bottom, whereby the liquid must flow upward through previously settled solids, thereby helping to remove fines from the liquid; a filter element positioned within the vessel, the filter element dividing the interior into a first chamber for receiving flocculated solids and liquid from the inlet and a second chamber for receiving liquid passed through the filter element; and an outlet for the liquid to flow from the second chamber.

In accordance with yet a further aspect of the invention, a method for collecting and separating flocculated solids and liquid may include the steps of providing a collecting and shipping vessel having an interior and a bottom; flowing flocculated solids and liquid into the collecting vessel near the bottom, whereby the liquid must flow upward through previously settled solids, thereby removing fines from the liquid; positioning a filter element within the collecting vessel, the filter element dividing the interior into a first chamber for receiving the flow of flocculated solids and liquid and a second chamber for receiving liquid passed through the filter element; and flowing the filtered liquid from the second chamber.

In the further aspects of both the apparatus and method of the invention, the filter element may extend upward from the bottom and may be tubular; and the second chamber may be surrounded by the filter element. The filter element may be tubular and the first chamber may be defined within the filter element. The filter element may be tubular and the second chamber may be defined within the filter element.

The apparatus and methods of our invention provide numerous significant advantages over the prior art. The apparatus is very versatile and works with a great variety of solutions to be treated and ingredients to be removed or recovered. It is clean, not messy, and eliminates direct handling of chemical precipitates, chemically coated filters and reaction chemicals. Automatic metering is used so that manual measuring of individual reactants for various batch sizes is not required. The apparatus is inexpensive to make and has a compact size, requiring minimal floor space ("footprint") compared to prior art equipment. No large solution storage tanks are required since a continuous or intermittent method is used rather than batch. No large settling or precipitation tanks are needed, which in conventional systems may require from several hours to several weeks to accomplish satisfactory settling, depending on composition. The reaction conduit and collection vessels do not need to be open to atmosphere. Therefore, with our invention there is a minimum of odors and contamination of solutions, worker exposure to vapors, corrosion of nearby equipment and facilities or need for large ventilating systems. Any objectionable gases such as ammonia which might be encountered are typically retained within the system. The collection vessel is inexpensive and also acts as the shipping vessel for precipitated solids. The method greatly extends the life of the filter used since settling is the primary mode of solids separation and filtration is only a secondary mode, even though done in the same vessel. Therefore a much greater quantity of solution may be passed through this system compared to conventional filtration. The apparatus is simple, having very few moving parts and easily replaceable components and therefore requires minimal maintenance and downtime. The method and apparatus provide real-time treatment of solution by simultaneous treatment steps at various zones in the system; therefore, each increment of solution receives essentially the same treatment regardless of when it enters the system. The method is highly reproducible for a given composition of solution. Use of the method may simplify compliance with certain hazardous chemical storage regulations by minimizing the amount and duration of storage of such hazardous materials.

Other advantages are provided by our invention. The apparatus is easy to use by operators unskilled in chemical technology. The apparatus easily may be made portable, easily transportable between sites by one person, and not dependent on fixed supporting utilities except for an electric source. A portable embodiment can be taken to the photographic or other process as needed and returned to storage when not needed. The apparatus provides totally automatic operation, is able to operate unattended at all hours including overnight, and starts and stops automatically as necessary. The apparatus and method provide low operating pressures. Extremely safe operation is provided due to relative lack of chemical spills and splashes since all reactants and products are contained. Only small quantities are being processed at a given time which precludes disastrous spills. The invention provides an inexpensive method, including materials and labor, of separating and transporting solids compared to existing techniques. The apparatus minimizes the potential to generate fine solid particles which normally tend to confound conventional settling and filtration methods. The invention features a built-in dewatering step which promotes compaction of the flocculated solids and concentration of the recovered silver to eliminate unwanted water, which thereby decreases shipping and recovery or treatment costs. The collecting/shipping vessel may be totally combustible, making refining of recovered metals less complicated and therefore less costly. The apparatus permits better estimates of the recovered silver in the shipping container by the equipment user, due to transparency or translucency of the vessel, consistency of collected product, and improved ability to estimate value of contents from weight, thereby ensuring that user will get a fair price from the refiner. The apparatus and method effectively operate over all typical effluent ranges of silver typically encountered in photographic processing wastes, from milligrams per liter to tens of grams per liter, using a single apparatus. This is compared to other conventional recovery systems which may require two or more systems in tandem, one for primary recovery to recover economically higher levels and the second for secondary recovery to reduce residuals to environmentally acceptable low levels. The invention permits flocculated solids, once collected, to remain undisturbed after collection, thereby eliminating separate secondary recovery operations. The apparatus can be operated by gravity flow if desired thereby saving costs of pumps and electricity. Therefore, the apparatus could readily be adapted for use in remote locations that do not have electricity.

Still other advantages are provided by our invention. The ready releasability and changeover of collecting vessels minimizes downtime and complexity of operation. The invention permits easy handling of reagents and collection vessels because of the relatively small sizes involved and the sealed nature of the collection vessels. The apparatus typically produces higher density flocculated solids in a given time than in conventional clarifiers because of the solids agglomeration or compaction mechanism inherent to the method. The reaction conduit is easily visually observable in operation to immediately discern and correct any operational problems. Since many applications of the invention will be in a retail environment, the apparatus can be enclosed easily in a simple and clean-appearing housing, which does not suggest an industrial treatment process. The simplicity and small number of components of the apparatus permit arrangement of the components in a wide variety of external geometries for different user circumstances. Batches of photographic processing or other solutions containing a variety of concentrations of silver or other ingredients are homogenized to a considerable degree and their concentrations damped out to more uniform concentrations, for more uniform treatment and greater reagent cost savings.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 7 illustrates schematically an apparatus for removing silver from spent photo-processing solutions in accordance with the invention, in which the reaction conduit comprises successive sections of tubing which increase in flow area between the inlet and outlet of the reaction conduit.

FIG. 10 illustrates schematically the collecting vessel of FIG. 9 with an overflow line and container for expelled liquid.

FIGS. 14 to 20, 30 and 31 illustrate schematically various embodiments of the collecting vessel according to the invention.

FIGS. 21 to 29 illustrate schematically various embodiments for admitting flocculated solids and liquid to a collecting vessel and for withdrawing separated liquid.

DESCRIPTION OF THE PREFERRED EMBODIMENTS

Figure 1:
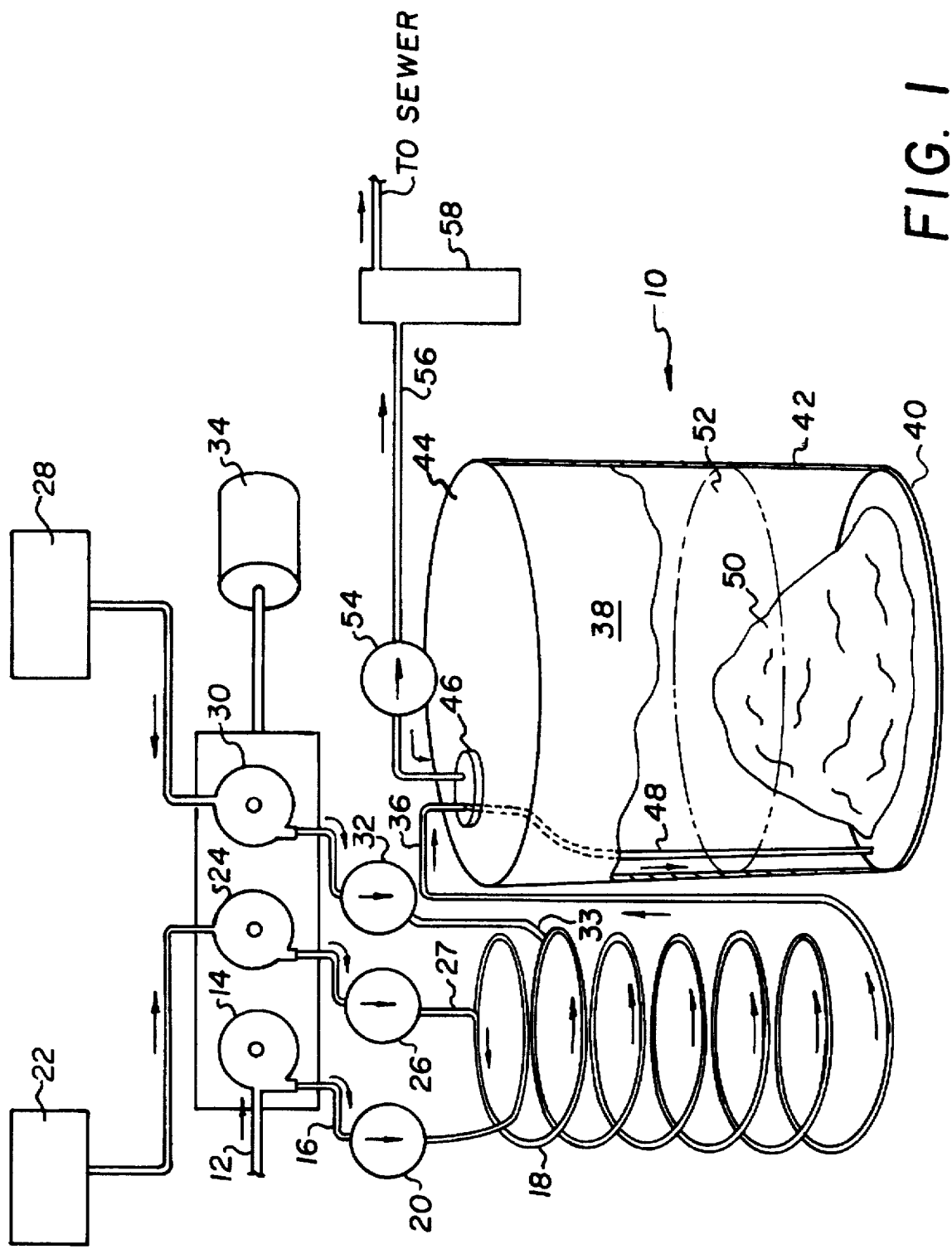
FIG. 1 illustrates schematically an apparatus for removing silver from spent photo-processing solutions in accordance with the invention, in which the unique enclosed reaction conduit in accordance with the invention is formed into a helical coil.

The following is a detailed description of the preferred embodiments of the invention, reference being made to the drawings in which the same reference numerals identify the same elements of structure in each of the several Figures.

FIG. 1 illustrates an apparatus 10 which functions in accordance with one embodiment of the method of the invention. The apparatus is useful for removing a variety of components from solutions, but is particularly useful for primary or secondary removal of silver from spent photo-processing solutions. An infeed conduit 12 is provided to deliver spent solutions from a holding tank, not illustrated, or directly from a photo-processing machine. The solutions are drawn through conduit 12 by a first pump 14 for delivering the solutions to the inlet end 16 of a reaction conduit means 18 which defines a mixing path. In some applications of the invention, pump 14 may be eliminated and the spent solution may be delivered from a tank, not illustrated, positioned to provide an adequate gravity head for flow into conduit 12. Conduit means 18 may be conventional flexible tubing such as transparent plastic tubing or the like and may be formed as illustrated into a helical coil to enhance mixing and to provide a compact arrangement. The axis of the coil may be generally vertical, as illustrated, or horizontal, or partly vertical and partly horizontal, or at any intermediate orientation. The coil may be open or flattened and its perimeter may have any regular or irregular shape. A check valve 20 optionally may be provided at the outlet of pump 14. A source 22 of a suitable precipitating agent, such as a solution of TMT for removal of silver, is connected to a second pump 24 for delivering the precipitating agent into conduit means 18 at a point just downstream of inlet end 16 and check valve 20. The spent solution and precipitating agent also may be delivered to the conduit means in the reverse order or essentially simultaneously, provided the proper ratios are maintained. A check valve 26 optionally may be provided downstream of pump 24 at an inlet 27 to the conduit means. A source 28 of flocculating agent is connected to a third pump 30 for delivering the flocculating agent into conduit means 18. A suitable flocculating agent for removal of silver is a cationic copolymer of acrylamide and acryloyloxyethyl trimethyl ammonium chloride available from the Calgon Corporation as Product No. POL-E-Z-2406. Commonly assigned U.S. Pat. No. 5,437,792 discloses various compositions of such a flocculating agent. A check valve 32 optionally may be provided downstream of pump 30 at an inlet 33 to the conduit means.

The flow from pump 30 is delivered into conduit means 18 downstream from inlet 27 from pump 24 at a distance chosen to provide a residence time sufficient for mixing the spent solutions and the precipitating agent and for forming a precipitate well suited for flocculation. That is, the residence time is long enough to enable crystals of precipitate to grow or ripen to a point at which addition of a flocculating agent will cause formation of flocculated particles which tend to agglomerate into clumps. Different spent solutions may require different residence times. The length of conduit can be readily determined experimentally for various spent solutions by those skilled in the art. Once the residence time has been determined for a given spent solution, reproducible results can be achieved in accordance with the invention. Conventional static mixing elements, such as those disclosed in U.S. Pat. No. 3,286,992, may be installed in conduit means 18 upstream or downstream, or both, of inlet 33 to facilitate good mixing. However, in many applications ordinary flow of spent solutions and precipitating agent will provide adequate mixing without static mixing elements. In the illustrated embodiment, pumps 14, 24 and 30 may be conventional peristaltic, diaphragm or bellows pumps or the like and may be driven by a common motor 34 to synchronize the pulses of liquid into conduit 18, thus potentially eliminating any need for check valves 20, 26, 32. Alternatively, if there is sufficient difference in elevation among reaction conduit means 18 and sources 22, 28 to provide adequate gravity head for flow into reaction conduit means 18 to produce suitable mixing of spent solution, precipitating agent and flocculating agent, then pumps 24, 30 may be eliminated without departing from the scope of the invention. Also, the downward direction of flow through conduit means 18 illustrated in FIG. 1 may be reversed to upward flow, as will be discussed further with regard to FIG. 4.

The outlet end 36 of conduit means 18 preferably is downstream from inlet 33 from pump 30 at a distance chosen with regard to the flow rate through conduit means 18 to provide a residence time sufficient for forming large, ripened clumps of flocculated particles of the precipitate. The residence time also is sufficient to allow the more ripened clumps to grow and agglomerate during passage through the conduit means into enlarged, apparently porous clumps. In this and other embodiments of the invention, many of these enlarged, apparently porous clumps individually extend across and substantially fill the cross-sectional flow area. These enlarged clumps move through the conduit means, sometimes rolling or tumbling. As a result, many of these enlarged clumps tend to scrub from the walls of the conduit means precipitated fines which may have adhered there. These enlarged clumps which fill the flow area also tend to substantially block passage of and strain from the liquid remaining fine particles, which then adhere to the enlarged clumps. Due to the agglomerating and straining, the density of the clumps appears to increase as they move through the conduit. Those skilled in the art will appreciate that various combinations and concentrations of spent solutions, precipitating agent and flocculating agent will produce flocculated solids having different characteristics and requiring different residence times to form the desired enlarged clumps which will control passage of fines and settle properly. As in the case of residence time for mixing of spent solution and precipitating agent, the length of conduit required for formation of such clumps can be readily determined experimentally for various anticipated combinations, after which reproducible results can be achieved.

The enlarged clumps of flocculated particles and remaining liquid flow upward from the lower end of conduit 18 and through outlet end 36 into a preferably enclosed collecting and shipping vessel 38 in accordance with the invention. Upward movement to outlet 36 helps with formation of the previously described enlarged clumps which substantially fill the cross-sectional flow area. In this and the other embodiments of the invention, reaction conduit 18 preferably should be kept full of solution at all times. Collecting vessel 38 preferably is small enough to be handled manually, sealed and shipped when full of flocculated solids and some liquid. A one to ten gallon (3.785 to 37.85 L) container will suffice for many applications, but smaller or much larger containers also may be used. Collecting vessel 38 typically will be cylindrical but may have many shapes including a bottom 40, side wall(s) 42 and a preferably sealed top 44. A removable, threaded cap or closure 46 is provided to manually, releasably connect conduit means 18 to vessel 38. Closure 46 has a through passage to which conduit means 18 is connected in any convenient manner, such as those to be discussed subsequently. Within vessel 38, a conduit 48 preferably extends below closure 46 to deliver the flocculated solids and liquid to a location near bottom 40. Thus, as the flocculated solids and liquid flow into the vessel, a mass 50 of solids collects on the bottom and a layer or volume 52 of separated liquid collects above mass 50. By "near the bottom of the vessel" is meant that flocculated solids and liquid are flowed into the collecting vessel close enough to the bottom to avoid undue breaking up of the clumps entering or already resting in the vessel or excessive stirring up of fines. The clearance to the bottom of the vessel may be adjusted depending on the spent solution being treated. When a sufficient mass 50 has accumulated on bottom 40 to rise above the lower end of conduit 48, the subsequently discharged flocculated solids and liquid will be forced to flow into mass 50, where the flocculated solids and much of the fines will be caught due to the self-filtering effect of mass 50. Liquid will rise through mass 50 without much disturbing the settled flocculated solids. The level of the clarified liquid rises to increasingly higher levels until the liquid leaves the vessel through another passage in closure 46, which may be connected to an optional check valve 54 provided just downstream of closure 46 in a discharge conduit 56. A final filter 58 may be provided in conduit 56 if necessary to remove additional fines before the liquid is discharged from the apparatus, such as to the sewer. FIGS. 14 to 31 illustrate alternate embodiments of collecting vessel 38 and modes for its attachment to receive flocculated solids and liquid. As can be understood from FIGS. 1 and 14 to 31 and their associated descriptive passages in this specification, collecting and shipping vessel 38 is closed, other than at the means for manually, releasably connecting the conduit for incoming liquid and solids and a port for a conduit for outgoing liquid. As illustrated, while the collecting and shipping vessel is connected to the overall apparatus, the vessel's being closed in this manner effectively prevents removal of settled flocculated solids from locations within the vessel which are below the level of the liquid in the vessel. As a result of this arrangement, the settled flocculated solids progressively accumulate, agglomerate and compact, trapping residual fines, expelling entrapped liquid and forcing the liquid upward from the agglomerated mass 50 toward the outlet of the vessel.

Use of collecting vessel 38 is preferred in accordance with the invention to provide optimum assurance that flocculated solids, once formed and ripened within conduit means 18, will be able to settle to a location where they subsequently will be disturbed very little and will be able to agglomerate into mass 50. As the higher specific gravity mass 50 forms and agglomerates on bottom 40, the lower specific gravity liquid which entered with the flocculated solids is gradually displaced upward in the vessel until it reaches discharge conduit 56. Then, when vessel 38 is full, incoming flow is stopped in any of the manners to be discussed shortly. The vessel is removed, sealed and replaced by an identical empty vessel. The full vessel may then be shipped away for further processing, such as to a refiner for recovery of precious metal.

EXAMPLE 1

A fixer/bleach-fixer/stabilizer/low-flow wash mixture from the KODAK Flexicolor film process C-41 and KODAK Ektacolor paper process RA-4, containing 3 grams/liter silver, was used as the feed solution in the apparatus shown in FIG. 1. Reaction conduit means 18 was a horizontal, flattened helix configuration having a generally oval shape. A 15% by weight solution of TMT (TMT-15) at a concentration of 305 gm/L in water was the precipitating agent in source 22. American Cyanamid Magnifloc 846A at a concentration of 1.0 gm/L in water was used as the flocculating agent in source 28. The total flow of solutions was as follows: 308 ml/min of spent solutions from pump 14, 6.15 ml/min of precipitating agent from pump 24, and 6.15 ml/min of flocculating agent from pump 30. Conduit 18 was a flattened helical coil of flexible transparent polyvinyl chloride tubing having a 0.375 inch (9.53 mm) inside diameter. Pumps 14, 24 and 30 were peristaltic pumps operated simultaneously on a common shaft by a 100-rpm motor 34. Collecting vessel 38 was a commercial 5-gallon (18.93 L) sealed polyethylene can for liquid shipment with top openings, of a translucent nature which allowed the operation and contents to be observed as the can filled with solids and liquid. Optional check valves 20, 26 and 32 were not used. Spent solution was injected into inlet end 16 at the side leg of a nylon tee, with precipitating agent injected into inlet 27 at an end leg of the same tee. The tee exited into conduit 18 containing a static mixer section immediately downstream of inlet 27. Initially, the static mixer section was tested at 24 inches (610 mm) in length, but experimentation for this particular combination of spent solutions and precipitating agent established an optimum length in this trial to be 8 inches (203 mm). A residence time downstream of the static mixing section sufficient for forming the silver-TMT precipitate initially was provided by a further conduit length of 26 inches (660 mm) downstream of the static mixer section; but further experimentation established this length to be more optimum at 20 inches (508 mm). Flocculating agent from source 28 was then injected through a second nylon tee into conduit 18 at inlet 33 from pump 30, the point of injection being approximately 28 inches (711 mm) downstream of inlet end 16. A second static mixer section, first tested at 8 inches (203 mm) long and later optimized at 4.5 inches (114 mm) long was placed in conduit 18 immediately downstream of inlet 33. A residence time downstream of the second static mixer section sufficient for forming clumps of particles of precipitate was provided by a further conduit length of about 58 inches (1473 mm) which provided approximately 2 minutes residence time for growth or ripening of clumps.

The flocculated solids formed in conduit 18 became enlarged, pea-sized clumps of yellow material with a mucoid consistency. The residence time was sufficient to allow the more ripened clumps to grow and agglomerate during passage through the conduit into enlarged, apparently porous clumps. Many enlarged clumps individually extended across and substantially filled the cross-sectional flow area. The enlarged clumps moved through the conduit, sometimes rolling or tumbling. As a results, many of the enlarged clumps tended to scrub from the walls of the conduit precipitated fines which had adhered there. The enlarged clumps which filled the flow area also tended to substantially block passage of and strain from the liquid remaining free particles, which then adhered to the enlarged clumps. Due to the agglomerating and straining, the density of the clumps appeared to increase as they moved through the conduit. These clumps were discharged into collecting vessel 38 through a 0.250 inch (6.35 mm) conduit 48 which ended about 0.5 inch (12.7 mm) above bottom 40. The mass of solids 50 which gradually built up around the end of conduit 48 served as a filtering medium to remove residual fines. Liquid effluent from vessel 38 passed through a bag filter 58 as a final polishing filter which removed any remaining fines in the liquid. The apparatus was permitted to operate intermittently for several days, to simulate actual operating conditions in a photographic processing laboratory. As the mass of material sat undisturbed in the collecting vessel for several weeks, small pockets of liquid that had still been entrapped in the settled solids were expelled upward, until the bottom solids were a relatively homogeneous solid yellow mass. The final silver concentration in the clarified liquid was less than 1 mg/L.

Figure 2:
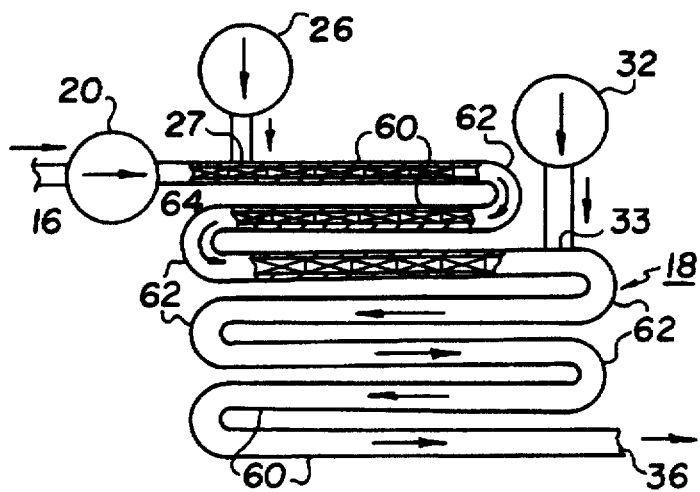
FIG. 2 illustrates schematically an embodiment of the reaction conduit which is formed into a horizontally undulating pattern.
Figure 3:
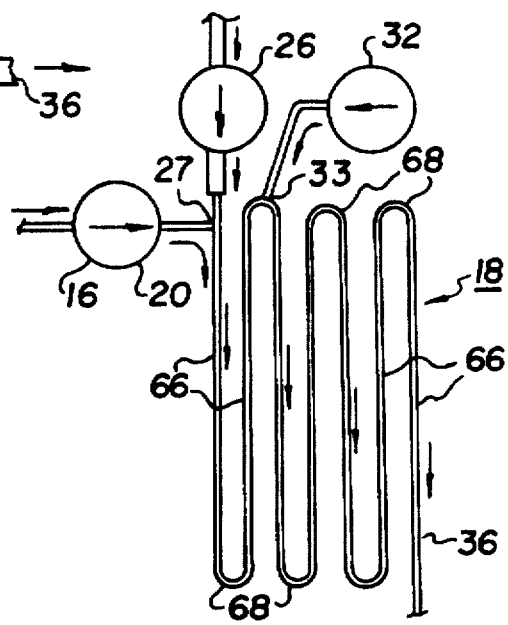
FIG. 3 illustrates schematically an embodiment of the reaction conduit which is formed into a vertically undulating pattern.

FIG. 2 illustrates an alternate embodiment of conduit means 18. Rather than the simple helical coil of conduit as in FIG. 1 or the flattened helix of Example 1, conduit means 18 can be arranged in an undulating, back and forth, rather sinusoidal pattern in which straight spans 60 of conduit are essentially horizontal between the connecting turns or curved portions 62. The changes of direction of the flow help to promote proper mixing. If desired for faster or more thorough mixing, conventional static mixing elements 64 of the type previously mentioned, may be installed in conduit means 18 between the inlet for precipitating agent and the inlet for flocculating agent, as indicated schematically by the cross-hatched areas. In some cases, static mixing elements may also be used after inlet 33 for flocculating agent. FIG. 3 illustrates another alternate embodiment of conduit means 18 in which the conduit is arranged in an undulating, up and down, rather sinusoidal pattern in which the straight spans 66 of conduit are essentially vertical between the connecting turns or curved portions 68.

Figure 4:
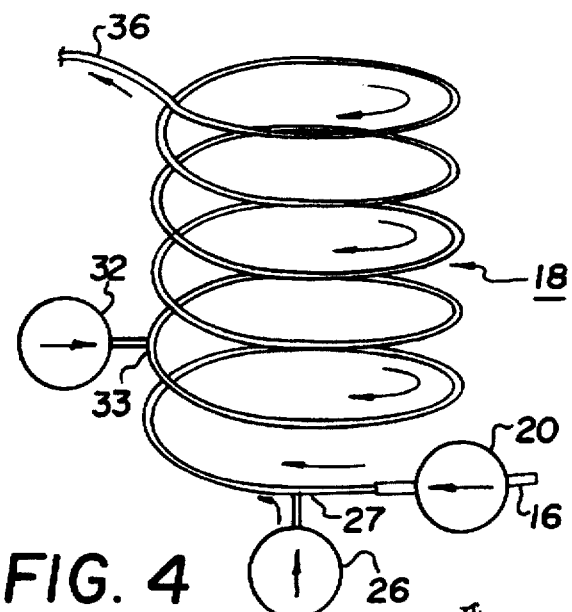
FIG. 4 illustrates schematically an embodiment of the reaction conduit which is formed into a spiral coil.

FIG. 4 illustrates still another alternate embodiment of conduit means 18 in which the conduit is arranged in a spiral whose radius decreases between inlet 16 and outer 36. An increasing radius from inlet to outlet would provide more gentle turns for the growing clumps of flocculated solids. The axis of the spiral may be horizontal, vertical or at any intermediate orientation. The spiral may be open or flattened. In the embodiment of FIG. 4, the spent solution, precipitating agents and flocculating agent flow upwardly in the conduit, which helps to improve growth of the clumps of flocculated solids, particularly in intermittently operated systems. Upward flow also may be used in the other embodiments of conduit means 18.

In some applications, the orientation of the mixing and precipitating portion of the coiled versions of conduit 18 advantageously may be different from that of the flocculating portion of conduit 18. For example, improved mixing of the effluent and the precipitating agent may be achieved if the portion of the coil for mixing the effluent and the precipitating agent is positioned with the axis of the coil essentially horizontal. The flocculating and clump-forming portion of the coil may be positioned below the mixing and precipitating portion, with the axis of the flocculating and clump-forming portion essentially vertical. For example, in the embodiment of FIG. 4, the portion of the coil between inlets 27 and 33 would be positioned above the remainder of the coil and would have an essentially horizontal axis. An example of this arrangement will be discussed with regard to FIG. 34.

Figure 5:
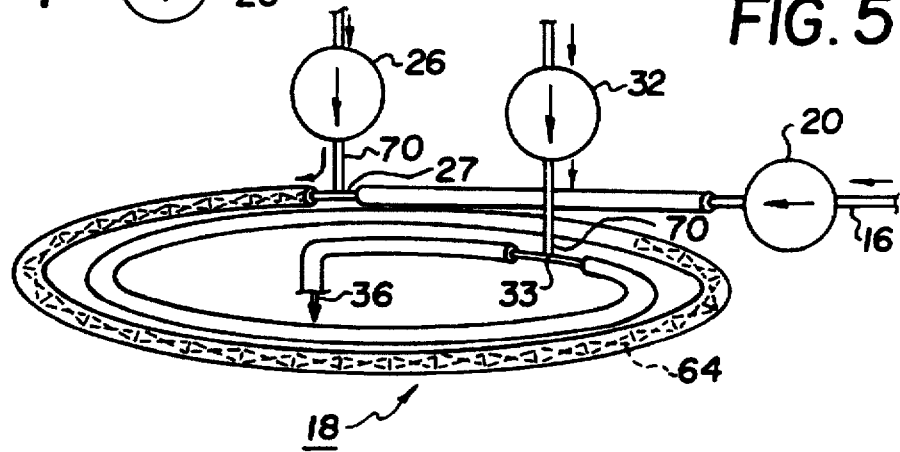
FIG. 5 illustrates schematically a perspective view of an embodiment of the reaction conduit which is formed into a flat coil.
Figure 6:
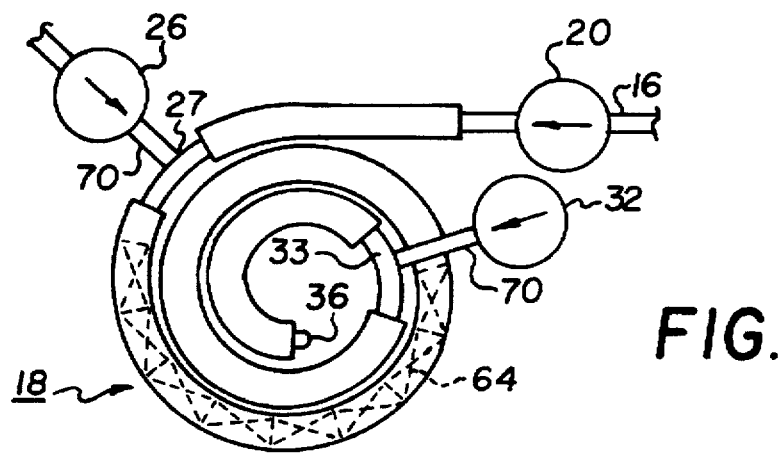
FIG. 6 illustrates schematically a plan view of the reaction conduit of FIG. 5.

FIGS. 5 and 6 illustrate yet another alternate embodiment of conduit means 18 in which the conduit is coiled into a flat coil with conventional T-fittings 70 for connecting adjacent sections of conduit and delivering precipitating and flocculating agents to the conduit. The embodiments of FIGS. 3 to 6 also may include static mixing elements located as in the embodiment of FIG. 2 and in Example 1. Those skilled in the art will appreciate that conduit means 18 may be formed into a wide variety of regular or irregular geometric shapes including ovals, figure-eights, triangular or rectangular coils, flattened helixes and spirals and the like, without departing from the scope of the invention.

FIG. 7 illustrates another embodiment of the apparatus of the invention in which conduit means 18 increases in flow area between inlet end 16 and outlet end 36. The increase in flow area may be stepwise, as illustrated, or gradual without departing from the scope of the invention. The increasing flow area permits the precipitated and flocculated solids to grow or ripen more fully as they move progressively more slowly along the conduit, thereby reducing the percentage of fines delivered to collecting vessel 38. Such a reduction in the fines reaching the collecting vessel has been observed visually as the clumps of flocculated solids grow during movement along the conduit and as the percentage of silver-TMT fines decreases in the clarified liquid. Also, calculated residence times in the conduit correlate with reduction in fines; that is, in a continuous flow of liquid and large, porous clumps in accordance with the invention, longer residence times lead to reduced fines. An initial section 72 of conduit means 18 receives a mixture of spent solution and flocculating agent and preferably includes static mixing elements 64.

EXAMPLE 2

For example, with a flow rate of spent solution in the range of 175 to 400 ml/min and a flow rate of precipitating agent (TMT-15) in the range of 3 to 8 ml/min, tubing having an internal diameter in the range of 0.250 to 0.375 inch (6.35 to 9.53 mm) and a length in the range of 0.5 to 3.0 inch (12.7 to 76.2 mm) as was suitable for section 72. More than 500 gallons (1893 L) of such spent solutions were processed. As the mixture flowed along section 72, the spent solution and the precipitating agent mixed thoroughly and particles of precipitate formed and grew. At the downstream end of section 72, the flocculating agent (American Cyanamid Magnifloc 846A) was delivered into the conduit at T-fitting 70 at a flow rate with range of 5 to 25 ml/min. The mixture of liquid, precipitate, flocculant and flocculated solids then flowed into a section 74 of conduit means 18 having an internal diameter in the range of 0.375 to 0.625 inch (9.53 to 15.88 mm) and a length in the range of 18 to 30 inches (457 to 762 mm). As the mixture flowed at lower speed along section 74, the precipitate gradually formed or ripened into larger and larger clumps of flocculated solids. The mixture then flowed into a section 76 of conduit means 18 having an internal diameter in the range of 0.75 to 1.0 inch (19.1 to 25.4 mm) and a length in the range of 18 to 30 inch (457 to 762 mm). As the mixture flowed at still lower speed along section 76, the clumps of flocculated solids continued to grow. The mixture then flowed into an upwardly running section 78 of conduit means 18 having an internal diameter in the range of 1.25 to 1.75 inch (31.8 to 44.5 mm) and a length in the range of 74 to 78 inches (1880 to 1982 mm). As the mixture flowed even more slowly along section 78, the clumps of flocculated solids continued to grow and reached substantially their maximum size when the mixture reached outlet end 36. Suitable connectors 80 were used to join sections 74, 76 and 78. From outlet end 36, the mixture of liquid and ripened flocculated solids flowed through downcomer 48 into collecting vessel 38, where the flocculated solids agglomerated to form mass 50 and the entrained liquid rose toward the outlet of the collecting vessel. Total silver content in the liquid effluent was in the range of 0.17 to 0.6 mg/L.

In each of sections 74, 76 and 78, the diameter and length should be chosen to facilitate formation of clumps of flocculated solids and permit the largest porous clumps of flocculated solids to pass readily without being broken up too much. However, the diameter and geometry or layout of each section should not be so constricted that the clumps may settle in low spots during prolonged idle periods and block the flow or so large that the clumps do not substantially fill the cross section of the conduit and therefore might be easily bypassed by the liquid carrying fines. Those skilled in the art will appreciate that such diameters will vary depending on factors such as the concentrations of the spent solution, precipitating agent and flocculating agent; and the flow rate through the conduit.

Figure 8:
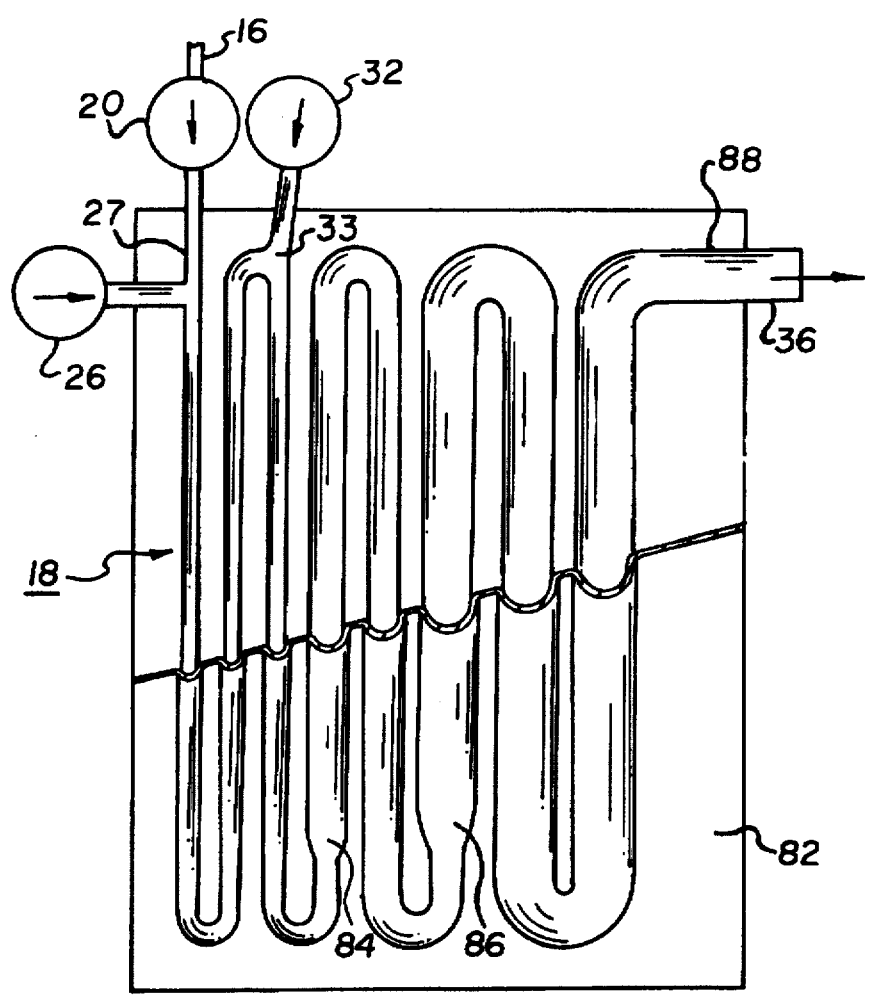
FIG. 8 illustrates schematically an embodiment of the reaction conduit which is curved into a vertically undulating pattern of conduits whose flow areas increase between the inlet and outlet of the conduit.

FIG. 8 illustrates a particular, more compact embodiment of the conduit means 18 of FIG. 7. In this case, the conduit may be formed readily as a panel of two sheets of thermoplastic which have been suitably thermoformed or from plate stock of suitable material which has been conventionally machined, or blow molded, or injection molded, or formed by any convenient manufacturing process. For example, a pair of sheets 82 of thermoplastic material such as polyvinyl chloride or acrylonitrile-butadiene-styrene may be thermoformed and sandwiched together to define conduit means 18. For ease of observation, one of such sheets may be transparent or translucent. An initial mixing and ripening section for spent solution and precipitating agent is defined between the inlet from check valve 26 and the inlet from check valve 32.

EXAMPLE 3

For infeed conditions of the type described for Example 2, the initial mixing section had an internal diameter of about 0.5 inch (12.7 mm) and a length of about 32 inches (813 mm). Depending on the particular spent solution and precipitating agent, static mixers 64 could be provided in this initial mixing section. Downstream of the inlet for flocculating agent through valve 32, a second mixing and ripening section began with an internal diameter of about 0.5 inch (12.7 mm) over a length of about 16 inches (407 mm); then extended through a smooth transition portion 84 into a section having an internal diameter of about 0.875 inch (22.23 mm) over a length of about 32 inches (813 mm); and finally extended through a smooth transition portion 86 into a section having an internal diameter of about 1.25 inch (31.8 mm) over a length of about 48 inches (1219 mm) terminating at a smooth portion 88 which opened through outlet end 36. If desired, mounting pockets for check valves 20, 26 and 32 could be incorporated between the thermoplastic sheets. In the embodiment of FIG. 8, the straight runs of conduit means 18 preferably were arranged vertically in operation.

Based on laboratory tests, during operation porous clumps of flocculated solids formed and grew or ripened as they passed up and down through the conduit, with the clumps agglomerating to form progressively larger and larger masses of flocculated solids while the liquid flow acted to drive the mixture through the conduit. The growing masses of flocculated solids tended to fill the cross-sectional area of the conduit and to entrap fines moving along in the liquid. Total silver content in the liquid effluent was less than 1.0 mg/L, after the polishing filter. Those skilled in the art will appreciate that the conduit means for FIG. 7 may be formed from a series of two or more connected panels of conduits or by other conventional means of forming a plastic part, without departing from the scope of our invention. Parallel panels also could be used.

Figure 9:
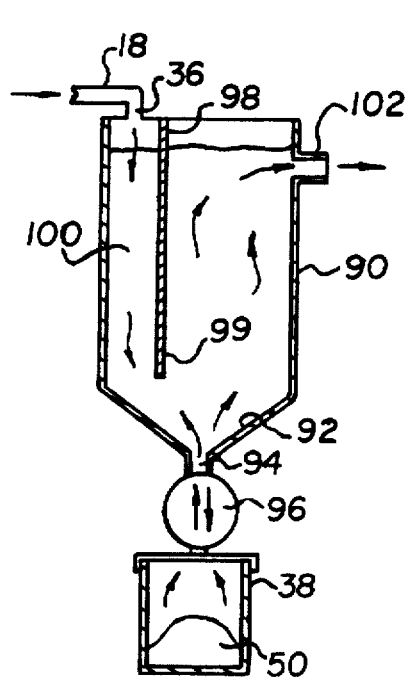
FIG. 9 illustrates schematically a settling vessel and collecting vessel useful in accordance with the invention.

For some spent solutions containing silver in an amount less than about 200 mg/L, addition of the precipitating agent may generate a high percentage of fine particles which are relatively slow to agglomerate even after addition of the flocculating agent. The modification of FIG. 9 is configured to reduce the number of such fines. A further improvement in fines reduction will be discussed with regard to FIG. 25. A generally cylindrical settling vessel 90 is provided for receiving the effluent of flocculated solids, fines and liquid from conduit means 18. Vessel 90 comprises a sloped or concave bottom 92 having an outlet opening 94 at its lowest point. A valve 96 optionally may be included to control the flow of solids and liquids, as described in more detail with regard to FIGS. 21 to 29. Within vessel 90 a baffle plate or wall 98 extends across a chord of the cross section of the vessel and terminates at a lower edge 99 near to bottom 92. Solids and liquid flowing in conduit means 18 are discharged through outlet end 36 into the open upper end of an enclosed inlet passage or downcomer 100 on one side of baffle plate 98. Alternatively, a downcomer tube may be used rather than baffle plate 98. See also the discussion of the embodiment of FIG. 11. As fines, clumps of flocculated solids and liquid flow downward in passage 100, the clumps continue to agglomerate and fines continue to adhere to each other and to existing clumps. As the clumps of solids move through valve 96, they essentially fill the cross sectional area of the valve and help to strain out fines. On the opposite side of baffle plate 98 near the upper end of vessel 90, an outlet opening 102 is provided for clarified liquid rising within the vessel. At the bottom of the settling vessel, rather than forming a thick accumulation for later removal in the manner of the prior art, flocculated solids settle continuously or intermittently through normally open valve 96 into collecting vessel 38 in the manner previously described. Thus, once the flocculated solids settle to the bottom of vessel 38, they essentially are not again disturbed. Liquid that enters collecting vessel 38 may be removed in the manner described with regard to FIG. 1. Alternatively, the liquid simply may be displaced upward gradually within the collecting vessel until the liquid actually flows slowly back into settling vessel 90, in the opposite direction of the solids passing downward through valve 96, and eventually leaves through outlet 102. When the collecting vessel is full, valve 96 is simply closed and vessel 38 is removed and replaced without any need to disturb again the solids already settled therein.

Since a small mount of liquid and solids may remain in the short length of tubing below valve 96 but above collecting vessel 38, the arrangement of FIG. 10 may be used to provide a convenient way to avoid spilling. An outlet 104 for liquid is provided in or near the top of the collecting vessel and is connected via a suitable conduit 106, which optionally may include a filter for fines, to an overflow collection vessel 108 for clarified liquid. Then, after valve 96 has been closed, outlet 104 may be opened and connected to conduit 106 to allow tie small amount of liquid and solids to drain into tie collecting vessel and displace liquid through opening 104 to collection vessel 108. Vessel 38 may be tilted slightly for decanting, if necessary. When the small amount has drained from below valve 96, outlet 104 may be closed and the liquid in vessel 108 may be returned to settling vessel 90, for instance.

Figure 11:
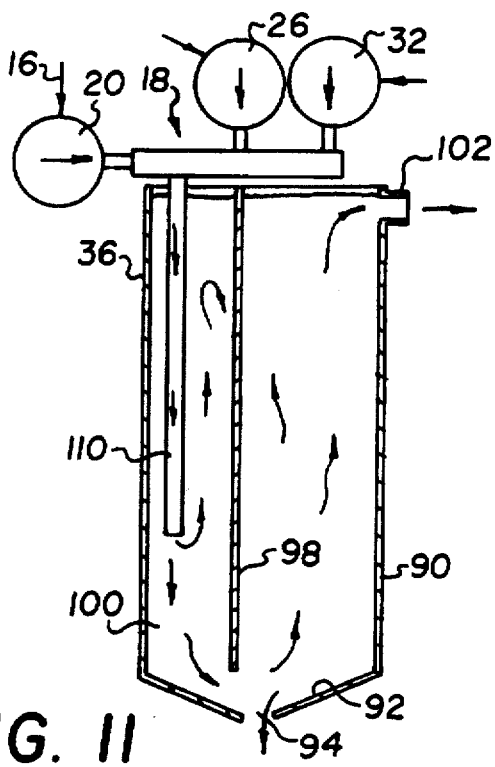
FIG. 11 illustrates schematically an application of the reaction conduit of FIGS. 5 and 6 with a settling vessel of FIG. 9.

FIG. 11 illustrates an embodiment of the invention in which the flat reactor coil of FIGS. 5 and 6 has been combined with the settling vessel of the apparatus of FIG. 9. A standpipe or downcomer 110 may be attached to conduit means 18 and extended downward through inlet passage 100 toward bottom 92. Thus, flocculated solids and fines passing downward through standpipe 110 will experience minimal additional shearing action and will have additional time to grow or ripen before flowing out into the still larger inlet passage 100 and on toward the bottom of setting vessel 90. Because standpipe 110 ends well above the lower edge 99 of baffle 98, any buoyant particles leaving standpipe 110 will tend to rise within passage 100 and have still more time to precipitate, agglomerate and settle. Thus, settling time for fine particles is extended in this embodiment. At the same time, the clumps of flocculated solids will settle to bottom 92 and move on through outlet opening 94 into the collecting vessel.

Figure 12:
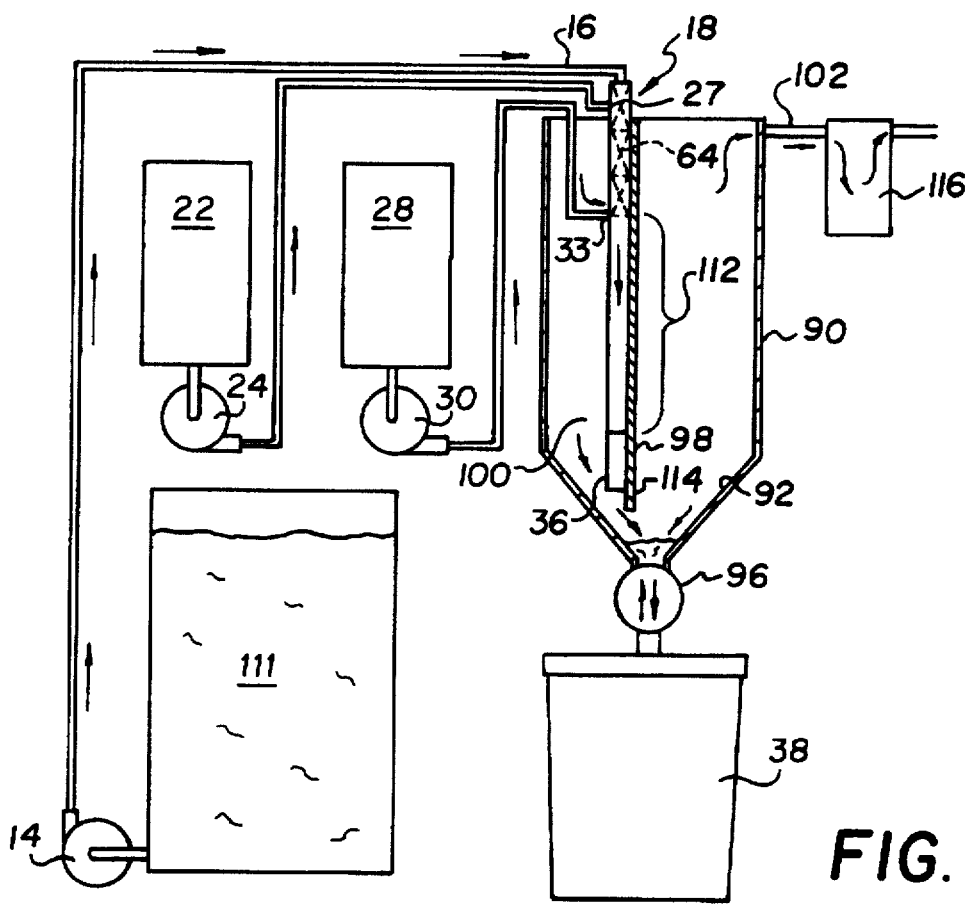
FIG. 12 illustrates schematically an apparatus for removing silver from spent photo-processing solutions in accordance with the invention, in which the reaction conduit is a tube with internal static mixing elements, the tube being extended into a settling vessel of FIG. 9.

FIG. 12 illustrates another embodiment in which sources 22 and 28 and a holding tank 111 for spent solutions respectively deliver precipitating agents, flocculating agents and spent solutions into a rigid conduit means 18 extended downward into inlet passage 100 next to baffle 98. If desired, conduit means 18 may be attached to or formed within baffle 98. For applications in which particularly effective flocculation is achieved within conduit means 18, baffle 98 may be omitted. Preferably, the conduit includes static mixer elements 64 upstream of the point of delivery of the flocculating agent. Depending on the degree of mixing of spent solutions and precipitating agent needed to ensure adequate precipitation, the length of conduit including optional static mixing elements can vary and flocculating agent from source 28 can be delivered into conduit means 18 at any point along a span 112 of the conduit. If necessary to permit further growth of the clumps of flocculated solids, an extension conduit 114 can be added to lengthen conduit means 18. A polishing filter 116 may be connected to outlet 102 if necessary for removal of fines.

In operation of the embodiment of FIG. 12, spent solutions are pumped out of holding tank 111 directly into conduit means 18. Precipitating agent is pumped from source 22 into the conduit just after entry of the spent solution and the two are mixed vigorously by mixer elements 64. After sufficient mixing of these solutions has been achieved, the flocculating agent is introduced along span 112. No further mixer elements are used after introduction of the flocculating agent, to avoid breaking up the clumps of flocculated solids as they move along conduit means 18. Those skilled in the art will appreciate that the precise point for introduction of the flocculating agent in this and other embodiments of our invention can be determined empirically and will depend on the number and type of mixer elements needed, the compositions and concentrations of the spent solutions and the precipitating agents, the type and concentration of the flocculating agent, the viscosity of the overall mixture, the pressures and flow rates of the various liquids and related factors. As the clumps of solids move through valve 96, they essentially fill the cross sectional area of the valve and help to strain out fines.

Figure 13:
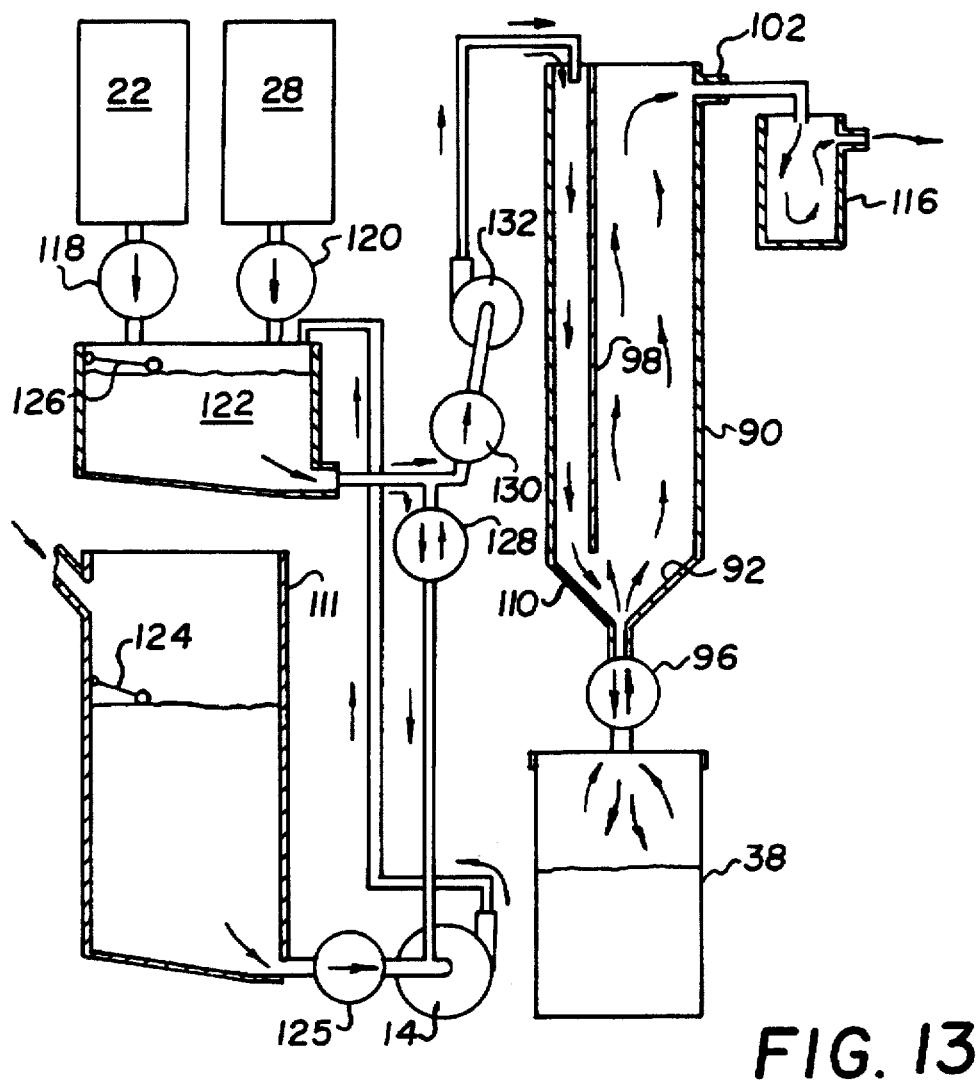
FIG. 13 illustrates schematically an apparatus for removing silver from spent photo-processing solutions in accordance with the invention, in which the spent solutions, precipitating agent and flocculating agent are mixed in a vessel and the mixture is pumped through a conduit into a settling vessel of FIG. 9.

FIG. 13 illustrates still another embodiment of the invention in which the various solutions are mixed in a vessel rather than in a continuous conduit. A valve 118 and a valve 120, respectively, are used to control gravity flow of precipitating agent and flocculating agent into a mixing vessel 122. Within holding tank 111, a float switch 124 is used to indicate the presence of a sufficient volume of spent solution to warrant operating the system. A valve 125 may be closed to stop flow from holding tank 111. Pump 14 delivers the spent solution into mixing vessel 122 where a float switch 126 is used to indicate the presence of a sufficient volume of all three solutions. Mixing in vessel 122 may result simply from turbulence of the liquids as they are introduced into the vessel or from use of a conventional prop mixer, not illustrated. A valve 128 may be closed to prevent back flow to the inlet of pump 14. A valve 130 may be closed to prevent flow toward a pump 132 used to deliver a mixture of liquids, precipitates and growing or ripening clumps of flocculated solids into the upper end of conduit 110 within settling vessel 90. Pump 132 preferably is a bellows pump or similar pump with low shearing tendencies to minimize any tendency to break up clumps of flocculated solids. As the clumps move downward in conduit 110, they continue to grow or ripen. A conventional programmable controller, not illustrated, may be used to govern to operation of the various pumps and valves.

The system of FIG. 13 preferably functions in a sort of continuous batch mode in which batches of liquids are pumped through periodically. However, those skilled in the art will appreciate that continuous operation also can be achieved in accordance with the invention, except for brief shutdown periods to exchange collecting vessels 38, to change filters 116 or, if needed, to replenish sources 22 and 28. In a continuous batch mode, spent solutions from photoprocessing systems are added to holding tank 111, either by manual dumps or by hoses or pipes from the photoprocessing system. Valves 118, 120, 125, 128 and 130 are closed. When the level of spent solutions reaches a predetermined level, float switch 124 signals the controller to open valve 125 and turn on pump 14 to deliver spent solution to mixing tank 122. As spent solution is pumped into mixing vessel 122, valve 118 is opened by the controller to deliver a predetermined quantity of precipitating agent which mixes turbulently with the incoming spent solution. When the level of solutions reaches a predetermined level, as determined by a timer in the controller or by float switch 126, the controller closes valve 125 to stop the flow of spent solutions from tank 111, opens valve 128 to drain vessel 122 to the inlet of pump 14 and closes valve 118 to stop the delivery of precipitating agent. Pump 14 continues to operate, at the same or a lower speed, to circulate the mixture of spent solution, precipitating agent and ripening precipitate from vessel 122 through valve 128 to pump 14 and back to vessel 122. After sufficient time has passed for adequate mixing, valve 120 is opened by the controller to deliver a predetermined quantity of flocculating agent into mixing vessel 122 and then closed. Circulation of the mixture may continue for a short time at the same or lower speed until sufficient mixing has occurred to form a satisfactory flocculated precipitate. Pump 14 then is stopped; valve 128 is closed; valve 130 is opened; and pump 132 is turned on to deliver liquids, precipitates and flocculated solids to the inlet of conduit 110 within settling vessel 90. Alternatively, rather than circulating the mixture after addition of the flocculating agent, pump 14 may be stopped; valve 128 may be closed; valve 130 may be opened; and pump 132 may be turned on to deliver the mixture. Though two pumps 14 and 132 are illustrated, those skilled in the art will appreciate that these functions can be performed with a single pump and suitable valving and piping.

Within conduit 110, the flocculated solids grow or ripen as they settle toward the bottom of vessel 90. At the lower end of baffle 98, most of the liquid and some of the fines separate from the clumps of flocculated solids and flow upward, eventually leaving through outlet 102 and filter 116 where any remaining fines are removed. The liquid discharged from filter 116 may be discarded. At the same time, most of the flocculated solids flow downward through valve 96 into collecting vessel 38. As the clumps of solids move through valve 96, they essentially fill the cross sectional area of the valve and help to strain out fines. When vessel 38 has filled with flocculated solids and some liquid, valve 96 is closed manually to permit the full vessel to be removed and replaced with an empty one. Any liquid between valve 96 and collecting vessel may be collected manually and returned to settling vessel 90 or holding tank 111. Vessel 38 of course may be removed and replaced at any time, whether full or not.

FIGS. 14 to 20, 30 and 31 illustrate alternative forms of collecting vessel 38 in accordance with the invention, which include various types of built-in filters to remove fines from the clarified liquid. In each of these collecting vessels, the liquid and clumps of agglomerated solids flow into a first chamber of larger flow area than that of the inlet conduit to the vessel, so that the flow velocity decreases and the clumps are permitted to settle, predominantly due to gravity effect, to the bottom of the vessel, before the liquid encounters the filter element. Thus, the life of the filter element is extended since most of the incoming solids do not encounter the filter before settling. When metals are to be removed from the flocculated solid, all materials of the collecting vessel may be combustible, to enable a refiner to place the entire container in a refining furnace unless it is an objective to recycle the containers for reuse.

These collecting vessels may be used for primary collection and filtration as in the systems of FIGS. 1 to 8, where the flocculated solids are settled directly in the vessel without any presettling. Typically, this would mean that all liquid undergoing treatment eventually would pass through the collecting vessel. Such an arrangement is appropriate where the flocculated or precipitated solids tend to settle quickly; however, buoyant or pasty solids might tend to blind or clog the filter rather quickly. Alternatively, such collecting vessels can be used for secondary settling and filtration, as in the systems of FIGS. 9 to 13, where much of the clarified liquid is removed from the settling vessel 90 and the solids are presettled in settling vessel 90 before passing into collecting vessel 38. In such secondary applications, the outlet from collecting vessel can be closed much of the time, making settling the primary mechanism of separation of liquid and solids, and can be opened only when necessary to remove accumulated liquid. A tertiary use of such collecting vessels would be as receivers for liquid flowing from settling vessel 90 through outlet 102 where a small mount of residual fines may be present.

Figure 14:
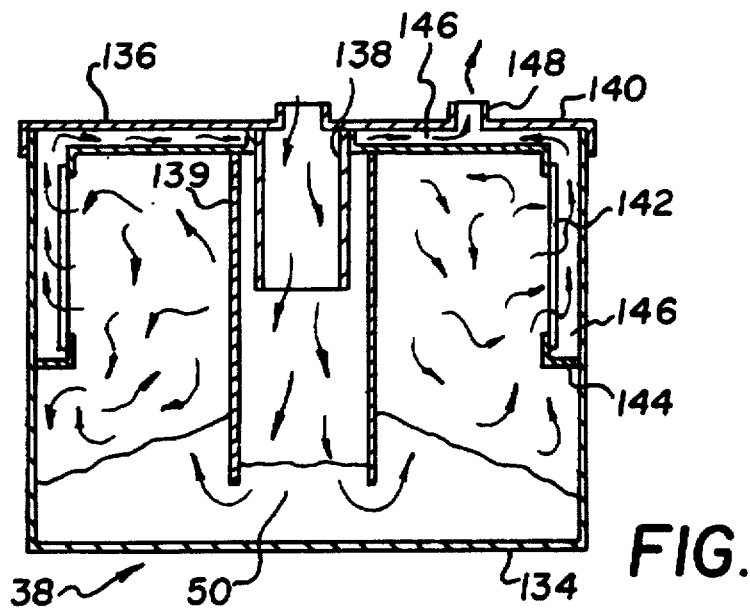
Figure 30:
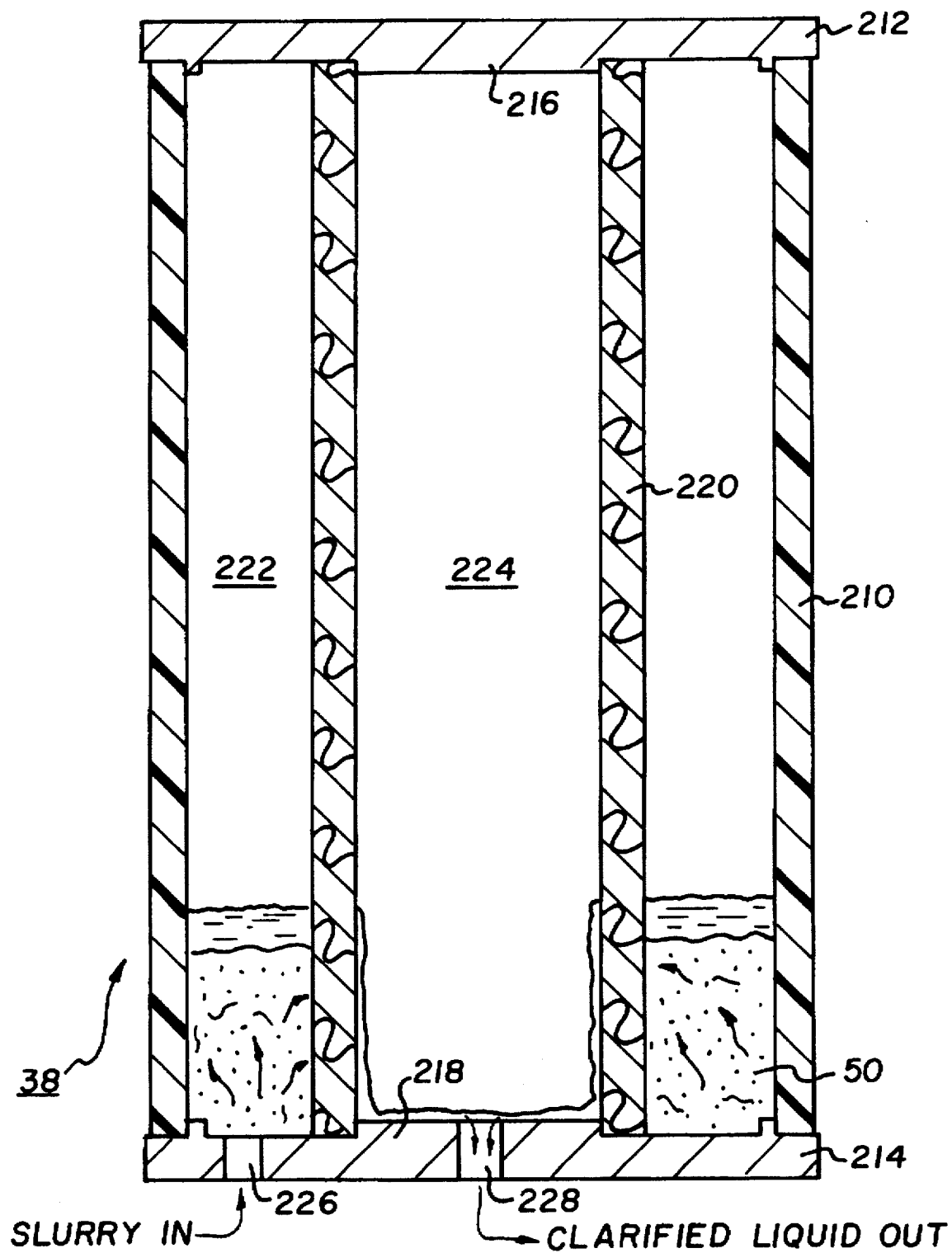
Figure 31:
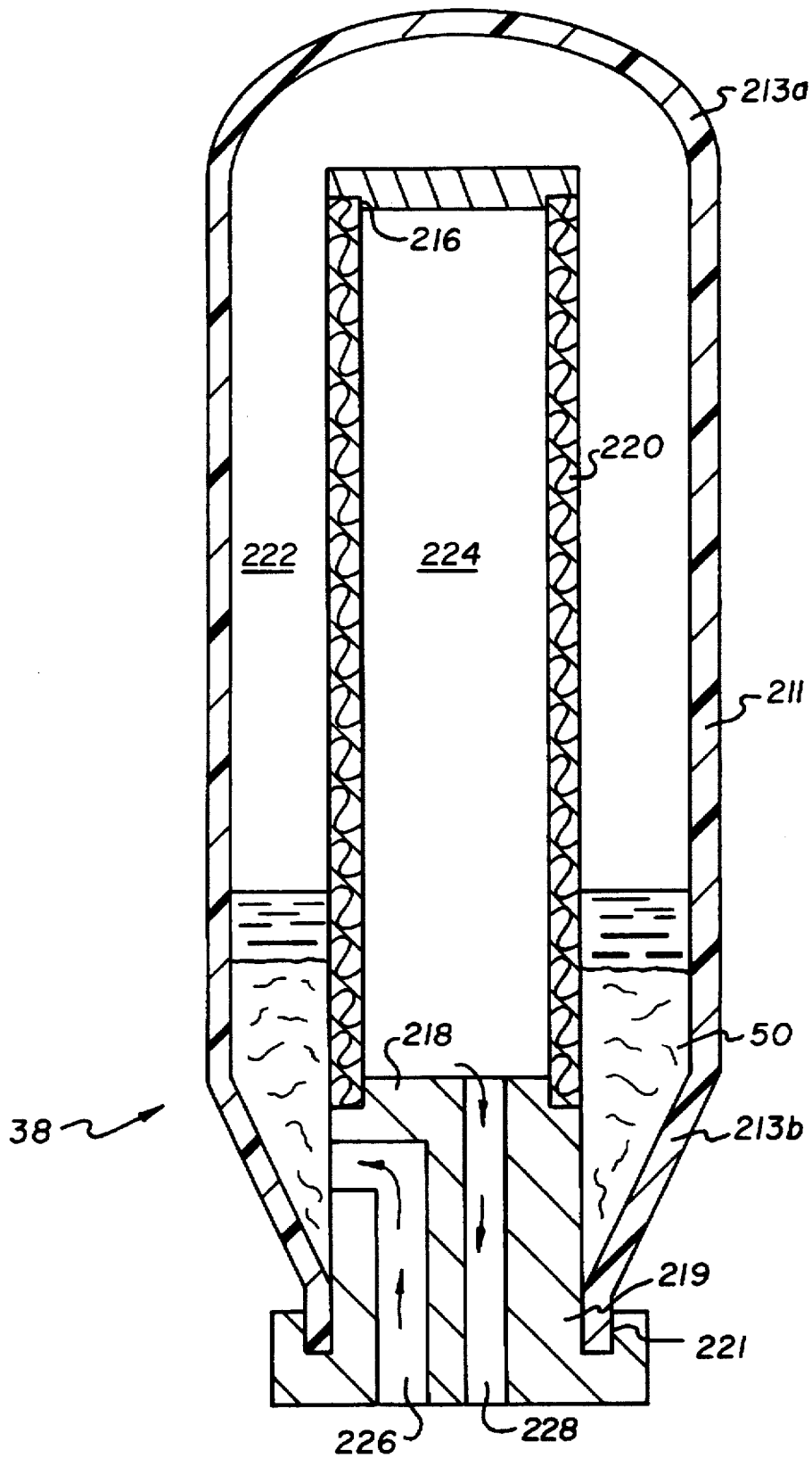

Except for the embodiments of FIGS. 30 and 31, each vessel 38 comprises a simple pail or bucket 134 which preferably is partially or fully transparent or translucent to permit visual observation of mass 50 of flocculated solids on the bottom of the vessel. The vessel may be closed by a preferably sealed lid or closure 136 so that, once filled, the vessel may be capped and used as a shipping container. In the embodiment of FIG. 14, an inlet conduit 138, which may be nested within another solid or perforated cylindrical baffle 139, extends downward from the underside of closure 136 and preferably extends near to the bottom of bucket 134, not illustrated. Thus, as previously described, flocculated solids will tend to settle around the lower end of the inlet conduit and force incoming liquid and solids to flow into and through previously settled solids to remove fines and improve growth of the clumps of flocculated solids. Generally, the smaller the diameter of bucket 134, the more the solids will tend to stir up in the bottom as more liquid and flocculated solids are introduced. For flow rates into the bucket in the range of 50 to 1000 ml/min, an internal diameter in the range of 4 to 30 inches (102 to 762 mm) would be expected to give good results. A filter support disk 140 extends radially around the inlet conduit and provides a support for the upper edge of an annular filter element 142, such as a ring of pleated paper filter material. An annular filter support ring 144 supports the lower edge of filter element 142. Thus, liquid and any fines flowing upward through mass 50 of flocculated solids move toward filter element 142 where the fines are removed. The clarified liquid then passes through a radial and axial clearance 146 surrounding the filter and above support disk 140, and leaves the vessel through a top outlet 148.

Figure 16:
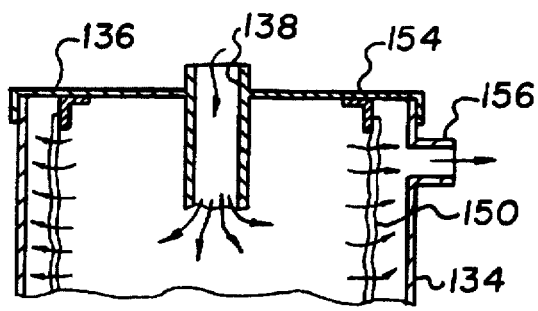

In the embodiment of FIG. 15, filter element 142 is replaced by a bag filter 150 of suitable porosity. Preferably, inlet conduit 138 extends close to the bottom of the bucket, not illustrated. The edge of the mouth of filter 150 is supported at the periphery of support disk 140. The clarified liquid then flows through the bag filter and leaves through a top outlet 152. The bag filter also helps to wick liquid out of mass 50. When the filter is full, vessel 38 is removed and replaced. In the embodiment of FIG. 16, support disk 140 has been replaced by an annular filter support ring 154 mounted on the underside of closure 136; and a side outlet 156 is provided through the wall of the bucket.

Figure 17:
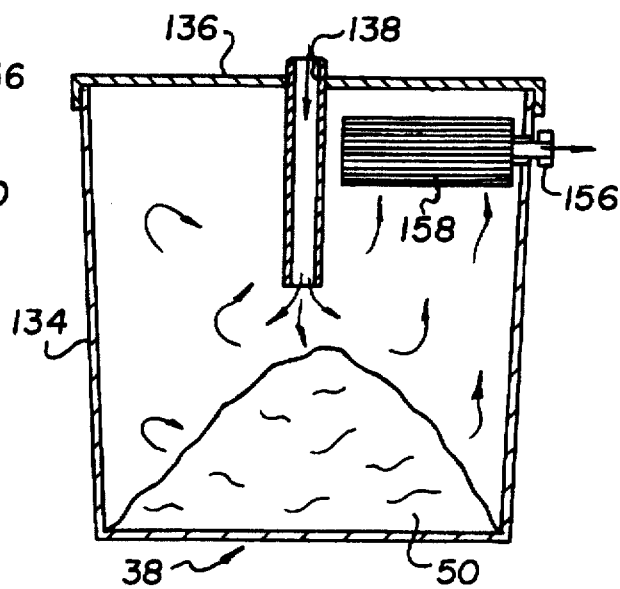
Figure 18:
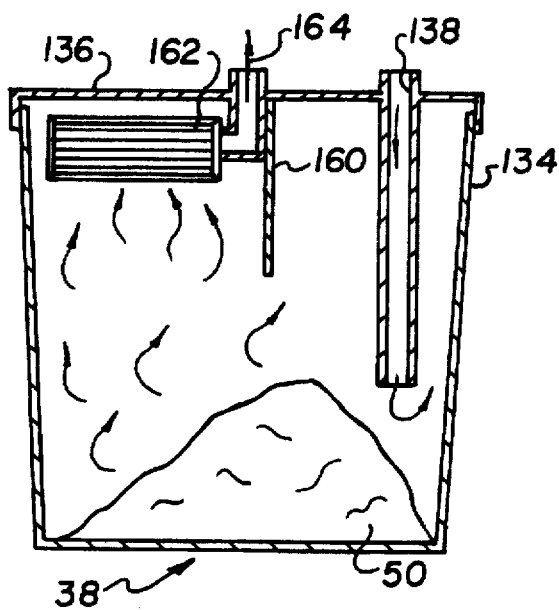
Figure 19:
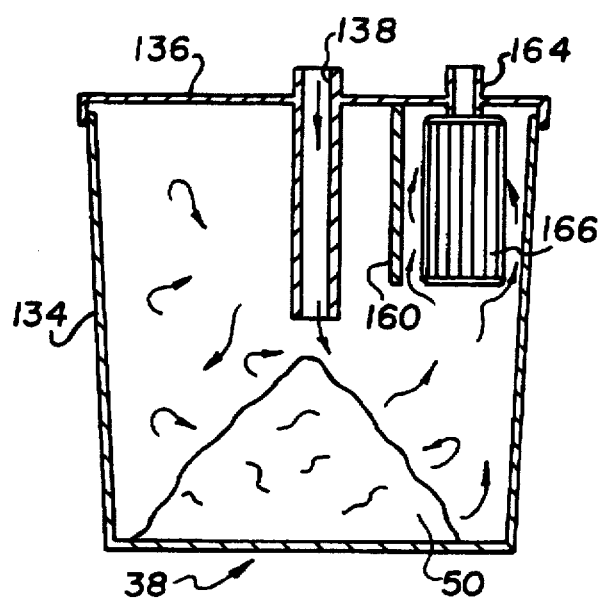

In the embodiments of FIGS. 17 to 20, conventional cylindrical, pleated paper filter cartridges are used to remove fines. In the embodiment of FIG. 17, the axis of a filter cartridge 158 is set horizontally to allow the clarified liquid to pass from the interior of the filter through outlet 156. In the embodiment of FIG. 18, inlet conduit 138 extends toward the bottom of the bucket at an off-center location. A baffle wall 160 extends across the width of the bucket to stop solids from short circuiting to the filter, thus allowing fines more time to agglomerate and clumps of solids more time to settle into mass 50. A filter cartridge 162 is set horizontally on the opposite side of baffle wall 160 from inlet conduit 138, to allow the clarified liquid to pass through a centrally located top outlet 164. In the embodiment of FIG. 19, the positions of inlet conduit 138 and outlet 164 are reversed from those of FIG. 17; and a filter cartridge 166 is set vertically. In the embodiment of FIG. 20, the positions of inlet conduit 138 and outlet 164 are reversed from those of FIG. 18. A restriction may be provided in outlets 156 and 164 to control the flow rate through collecting vessel 38 and reduce the chances of stirring up fines from mass 50.

Normal density differences between the flocculated solids and the liquid should allow the solids to settle into vessel 38 and the liquids to rise back into settling vessel 90 for discharge through outlet 102 or to rise within vessel 38 for discharge through outlet 56, 148, 152, 156 or 164. When the collecting vessel first begins to fill, entry of solids and liquid naturally will cause convection currents, coupled with Brownian and displacement movement of the solids. In the collecting vessels of FIGS. 1, 14 to 20, 30 and 31, these currents and disturbances are confined to the interior of the vessel. If the liquids and solids are discharged from conduit 138 a substantial distance above the bottom of the vessel, the height through which the solids must settle will decrease as the vessel fills and mass 50 accumulates, which will tend to reduce such currents and disturbances. However, as previously discussed, preferably the flocculated solids and liquids are discharged near the bottom of the collecting vessel to take advantage of the filtering effect of mass 50. For the collecting vessels of FIGS. 1 and 14 to 20, the vessels eventually will be substantially full of settled solids, plus a rather thin covering layer of liquid and some liquid held interstitially within mass 50. At that time, the full vessel is removed and replaced.

FIGS. 21 to 29 illustrate various alternative features of the invention which can be used to connect and disconnect vessel 38 from the overall system. Whether or not vessel 38 includes an outlet for liquid, a quick disconnect fitting, such as a conventional Banjo fitting, may be provided in the conduit leading into vessel 38. Suitable conventional quick disconnect fittings are available from Terra Products, Inc. of Crawfordsville, Ind. The female end 168 of such a fitting cooperates in the known manner with the male end 170 and the fitting may be oriented as illustrated in FIG. 21 or FIG. 22. In the arrangement of FIG. 22, liquid and solids draining from male end 170 tend to flow into the open cavity 176 of female end 168, thus reducing chances of spillage. Below the fitting, a standpipe 172 extends upward from a screw-on cap 174 suitably mounted to vessel 38. Thus, when the flow of liquids and solids is stopped, such as by closing valve 96, and fitting 168/170 is disconnected, a small amount of liquids and solids will remain in standpipe 172. Vessel 38 simply may be tipped to pour off this small amount, after which cap 174 and standpipe 172 are removed and replaced with a plain screw on cap. Cap 174 and standpipe 172 are then mounted to an empty collection vessel and fitting 168/170 is reconnected to permit continued operation of the system. If the flocculated solids have a rather mucoid consistency, such as flocculated silver TMT precipitate, the flow areas through the valve and quick disconnect fitting and into vessel 38 must be large enough to permit solids to move downward and liquid to move upward, such as in the embodiments of FIGS. 12 and 13. For example, a flow area approximately 0.75 to 3.0 inch (19.1 to 76.2 mm) in diameter has been found to be effective for flocculated silver TMT precipitate. To aid with drainage into vessel 38, valve 96 may be a three-way valve 178 of the general type illustrated in FIGS. 23 and 24. A vent conduit 180 is connected to one port of valve 178; so that, with the valve closed as in FIG. 24, liquid and solids flow readily downward through the quick disconnect fitting 168/170.

Where the density of the flocculated solids is close to that of the remaining liquids and there is a tendency for fines to be generated, operation of collecting vessel 38 can be improved by providing one path into the vessel for downward moving flocculated solids and liquids and another, separate path from the vessel for clarified liquids. Such an arrangement also helps to prevent fines from short circuiting the collecting vessel. FIGS. 25 to 29 illustrate various embodiments of such separate paths.

Figure 26:
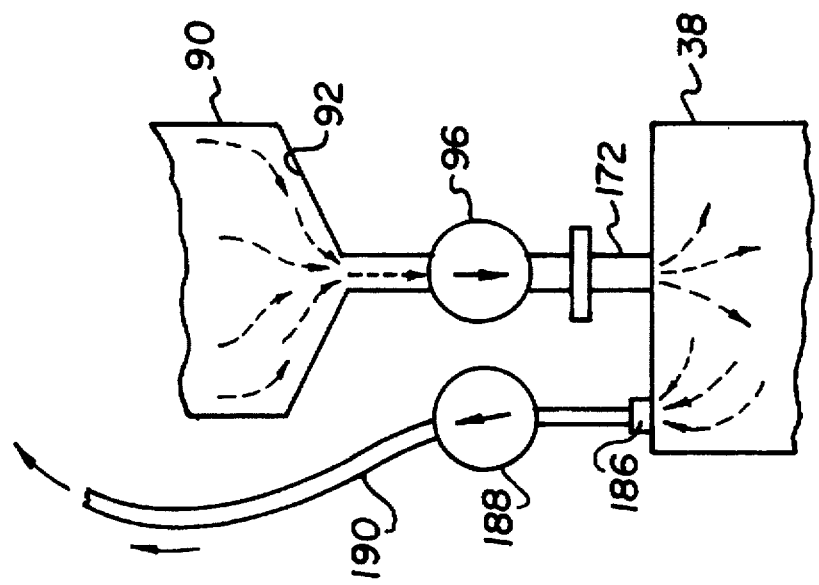
Figure 25:
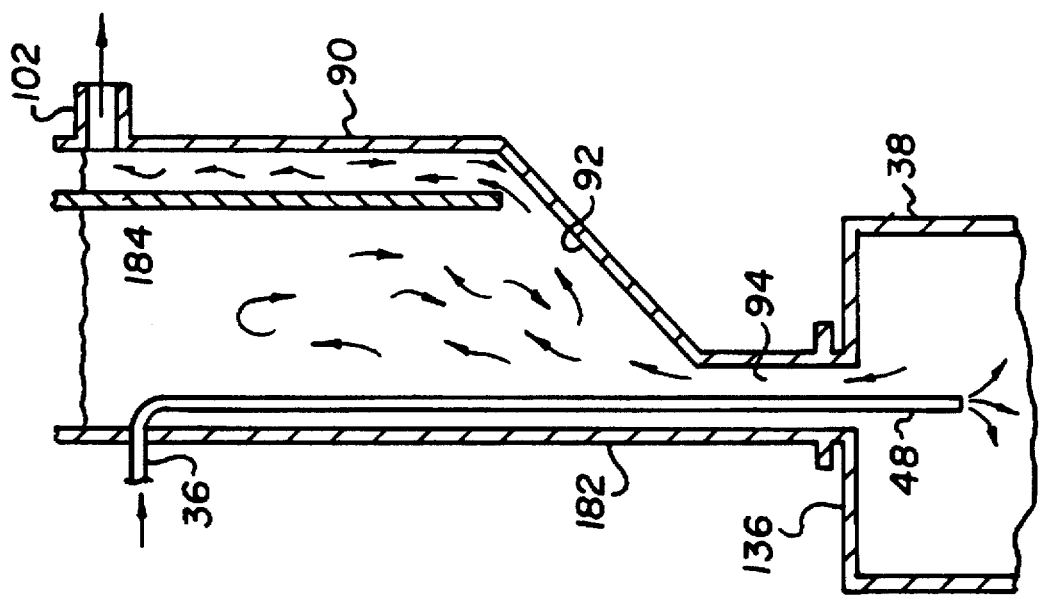

In the embodiment of FIG. 25, an extension conduit 182 is provided from the outlet end 36 of conduit means 18 downward in settling vessel 90, through outlet 94 and into collecting vessel 38. Due to this arrangement, clarified liquids rising from vessel 38 can pass upward through opening 94 without disturbing or being disturbed by the downward flow in conduit 182. A baffle plate 184 extends across settling vessel 90 opposite outlet 102; so that, a portion of any fines rising into the settling vessel will have an opportunity to agglomerate and settle downwardly through outlet 94. A potential drawback of the embodiment of FIG. 25 is the lack of a valve between the settling vessel and the collecting vessel, which can complicate removal and replacement of the collecting vessel. One alternative arrangement which eliminates this drawback is illustrated in FIG. 26. Here, in parallel with standpipe 172, vessel 38 is provided with a top outlet 186 which is connected to a valve 188 by a suitable conduit 190. Thus, clarified liquid can be withdrawn through conduit 190 and returned to settling vessel 90, if a settling vessel is used, or discharged from the system.

Figure 27:
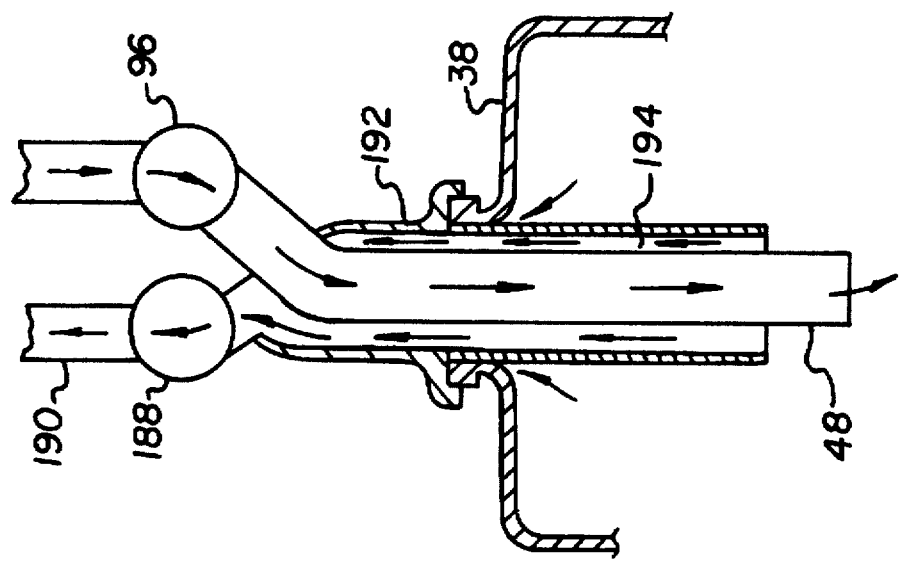
Figure 29:
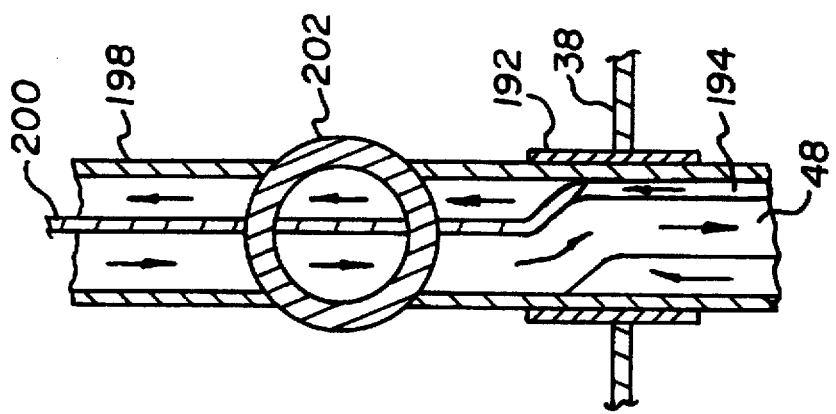
Figure 28:
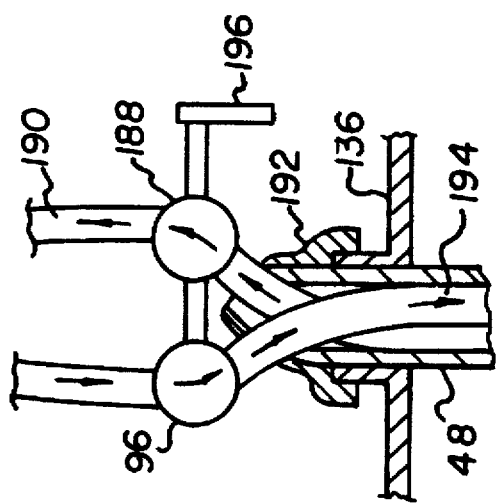

Another alternative arrangement is illustrated in FIG. 27. The inlet conduit 48 for flocculated solids and liquid extends into vessel 38 through a fitting 192 which positions conduit 48 concentrically within an outlet conduit 194 for clarified liquid. The flow area of conduit 48 preferably is considerably larger than that of conduit 194, to allow easy passage of clumps of flocculated solids. Fitting 192 preferably is threaded for removal from vessel 38. Valve 188 functions as in the embodiment of FIG. 26. Quick disconnect fittings would be provided below both of valves 96 and 188. FIG. 28 illustrates a variation of the embodiment of FIG. 27 in which the two valves share a common actuator 196. In the embodiments of FIGS. 26 and 27, tie inlet and outlet conduits could be arranged side by side rather than concentrically. FIG. 29 illustrates another alternative arrangement in which a combined inlet and outlet conduit 198 comprises a central divider wall 200 to define such side by side conduits. A ball valve 202 is provided with a divided flow passage for simultaneously opening and closing the two conduits.

FIG. 30 illustrates still another embodiment of collecting vessel 38 which is particularly useful in accordance with the invention. A cylinder 210, preferably transparent or translucent and preferably but not necessarily circular in cross section, is made from any suitable material such as clear plastic. A top end cap 212 and a bottom end cap 214 are provided with central bosses 216, 218 which extend into the interior of cylinder 210 and support between them a conventional tubular, pleated paper filter element 220. The filter element preferably should be a single pass filter made from totally combustible materials, should have a nominal porosity less than 0.5 microns and should have sufficient structural rigidity to withstand operating pressure differentials. Although filter element 220 as illustrated extends from bottom end cap 214 to top end cap 212, a shorter filter element which terminates below top end cap 212, or above bottom end cap 214, or both, may also be used without departing from the invention. An upwardly extending annular collecting chamber 222 is separated by filter element 220 from an upwardly extending liquid discharge chamber 224 defined within the filter element. Although a tubular pleated filter element is preferred to define chambers 222 and 224, those skilled in the art will appreciate that any filter element could be used, such as a flat filter extended across a chord of cylinder 210, which divides the interior of the cylinder into parallel, upwardly extending collecting and discharge chambers. At the bottom of chamber 222, an inlet 226 is provided for flocculated solids and liquid; however, a suitable downcomer conduit could also be used to introduce the solids near the bottom of chamber 222, in a manner similar to conduit 48 of the embodiment of FIG. 1. The solids and liquid could also be introduced through the side wall of cylinder 210 near the bottom of chamber 222. At the bottom of chamber 224, an outlet 228 is provided for clarified liquid which has passed through filter element 220. In one actual embodiment of this collecting vessel, cylinder 210 had an inside diameter of about 6.0 inches (152 mm) and a length of about 20 inches (508 mm). Filter element 220 was assembled from a pair of commercially available Harmsco filter elements No. 801-0.35, manufactured by Harmsco, Inc. of North Palm Beach, Fla. The filter elements were placed end-to-end and had a nominal porosity of about 0.35 microns, an inner diameter of about 1.0 inch (25.4 mm) and an outer diameter of about 2.375 inch (60.33 mm).

During use of the collecting vessel of FIG. 30, dumps of flocculated solids accumulate on the bottom of chamber 222 to form mass 50 and liquid flows through filter element 220 to outlet 228. As mass 50 rises around filter element 220, the lower portion of the filter element gradually becomes partially obstructed due to the presence of mass 50. However, the liquid which rises out of mass 50 continues to flow through a fresh or relatively unobstructed portion of the filter element. As filter element 220 becomes more less blocked by the progressive rise of mass 50, the effective outlet from chamber 222 moves upward along the filter element. Thus, even when the collecting vessel essentially is full of flocculated solids, them continues to be a percentage of the filter through which the liquid can pass. Since the liquid and solids are introduced near the bottom of chamber 222, many fines tend to be filtered out within mass 50, which further reduces the burden on the filter element, though increased inlet pressure may be needed to force the liquid and solids into mass 50 at the end of a run.

FIG. 31 illustrates an alternative embodiment of the collecting vessel of FIG. 30. Cylinder 210 and end caps 212, 214 have been replaced by a molded shell or housing 211 having domed ends 213a, 213b rather like a common container for carbonated beverages. The domed ends permit pressurization of the container without much concern for loosening or leaking of end caps. A closure plug 219 extends upwardly into housing 211 to support filter element 220. A suitable threaded connection 221 secures plug 219 to housing 211. Inlet 226 and outlet 228 extend through plug 219. Alternatively, inlet 226 may be provided through the wall of housing 211 near the bottom of chamber 222, not illustrated. Suitable plugs, not illustrated, are used to close inlet 226 and outlet 228 for shipment of a full collecting vessel. In the collecting vessels of FIGS. 30 and 31, chamber 222 may be provided with a one way vent valve, not illustrated, to admit air to the chamber to prevent formation of a vacuum and to facilitate drainage through outlet 228.

Figure 32:
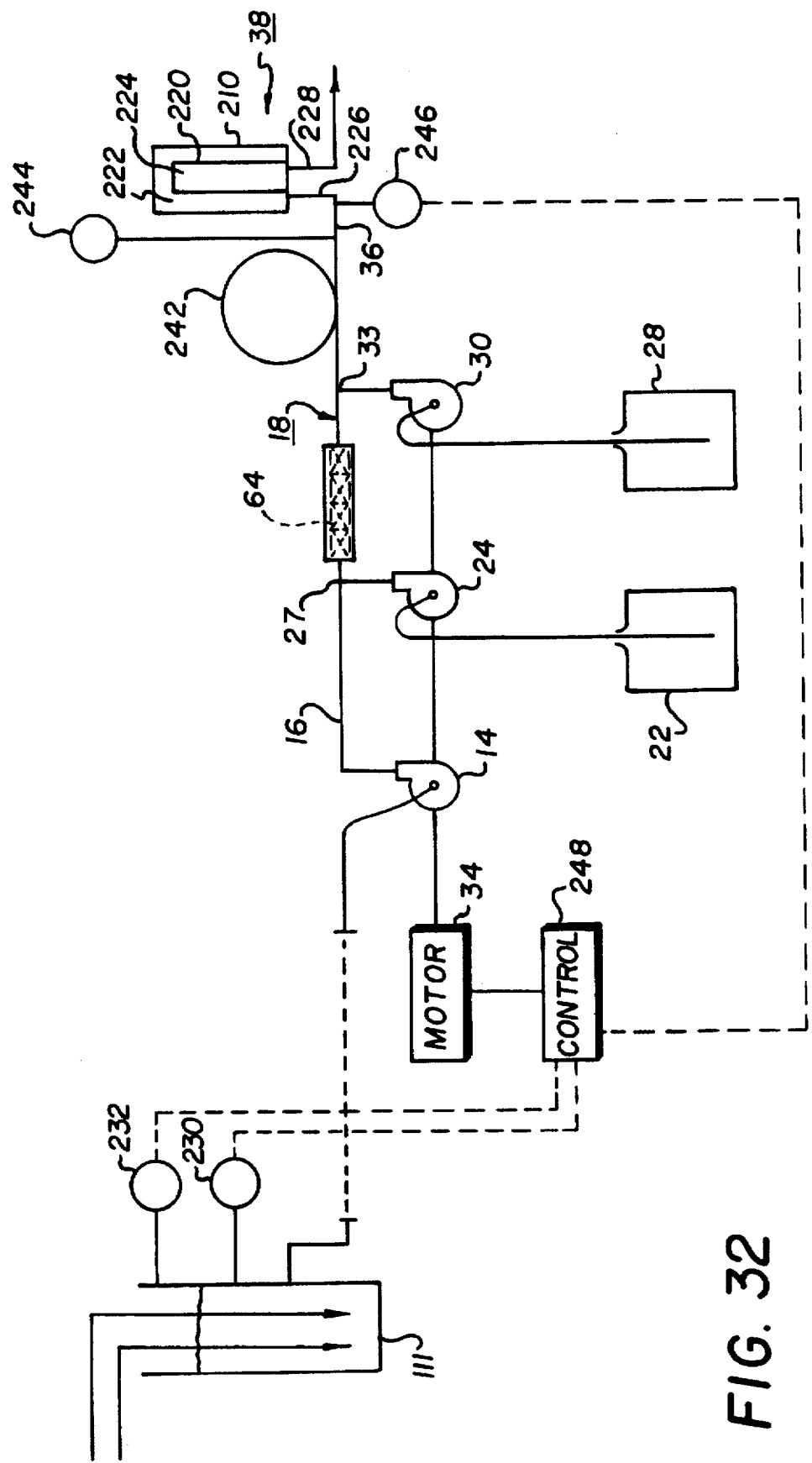
FIG. 32 illustrates schematically an apparatus for removing silver from spent photo-processing solutions in accordance with the invention, in which the collecting vessel of FIG. 30 is used.

FIG. 32 illustrates schematically an apparatus or system according to the invention which comprises the collecting vessels of FIG. 30 or 31. Many of the components of the embodiment of FIG. 1 are included. Holding tank 111 is provided with a low level shut-off float switch 230 and a high level shut-off float switch 232. Low level switch 230 is positioned to provide a control signal when the volume of spent solutions falls to a residual volume needed for blending with subsequently added spent solutions to damp out differences in composition and concentration of spent solutions introduced into conduit means 18. Those skilled in the art will appreciate that a holding tank embodying such a low level switch and residual volume also could be used for delivery of spent solutions in the embodiments of FIGS. 1 to 13. The discharge of precipitating agent from pump 24 passes into conduit means 18 at inlet 27 just upstream of an inlet end of a section of conduit means 18 comprising optional static mixer elements 64. The discharge of flocculating agent from pump 30 passes into conduit means 18 at inlet 33 just upstream of an inlet end of a conditioning coil 242 of suitable tubing, in which the clumps of flocculated solids continue to grow or ripen before entering collecting vessel 38. As in previously described embodiments, many enlarged clumps individually would extend across and substantially fill the cross-sectional area of coil 242, to produce the desired blocking and straining effect for remaining fines. If desired, a static mixing zone also may be included between inlet 33 and conditioning coil 242. A pressure gage 244 near the inlet to collecting vessel 38 indicates the inlet pressure, which would be expected to rise as vessel 38 fills with flocculated solids. A pressure switch 246 senses this same pressure and signals a conventional programmable controller 248 when the inlet pressure exceeds a predetermined limit, at which point the controller shuts off motor 34 to stop the various pumps; and collecting vessel 38 is replaced. When the control signal from switch 230 indicates a low level in holding tank 111, controller 248 shuts off motor 34 until switch 232 signals that a sufficient volume of spent solutions has accumulated for continued treatment.

In one actual version of the system illustrated in FIG. 32, holding tank 111 had a volume of about 20 gallons (75.71 L). Conduit means 18 was formed from 0.25 inch (6.35 mm) internal diameter tubing upstream of conditioning coil 242, which was formed from 30 feet (9.14 m) of 0.5 inch (12.7 mm) internal diameter tubing. The section of static mixers was about 2 inches (51 mm) long. The tubing from sources 22 and 28 had an internal diameter of about 0.0625 to 0.125 inch (1.59 to 3.18 mm). Pumps 14, 24 and 30 were peristaltic pumps operated to provide a flow from holding tank 111 of about 200 ml/min. and flows from sources 22 and 28 of about 4 ml/min. When a sufficient volume of spent solutions was accumulated in holding tank 111, float switch 232 signaled controller 248 to start motor 34 and pumps 14, 24 and 30. Until the level in tank 111 reached float switch 230, the system continued to operate. Well-grown or ripened clumps of flocculated solids were delivered from conditioning coil 242 to the inlet of collecting vessel 38 and acceptably clarified liquid was discharged from the outlet of the vessel. The desired blocking and straining effect for remaining fines was observed in the conditioning coil and the collecting vessel. Under continuous operating conditions, a collecting vessel 38 of the type and size described with regard to FIG. 30 required replacement about every 40 hours of continuous operation. When float switch 230 indicated low level in tank 111 or sensor switch 246 indicated high inlet pressure to vessel 38, controller 248 stopped motor 34.

EXAMPLE 4

The spent solution contained paper process developer, paper process bleach-fix, paper process stabilizer, film process developer, film process bleach, film process fix, and film process stabilizer. Initial silver content of this mix of solutions was 1.7 g/t,. The percentages of each of the spent solutions was in proportion to what would be expected in normal operation of a typical minilab photoprocessor. This mix of solutions was treated in a system similar to those described in Example 1 and shown in FIG. 32. The performance of the system was acceptable, but the flocculated solids were not as tightly bound as those seen in Example 1. The more loosely bound solids filled the settling filter, similar to that of FIG. 30, more quickly. The experiment was terminated after approximately 40 gallons (151.4 L) of solution were treated. Silver removal was excellent, with total (soluble plus insoluble) silver content of the system effluent analyzed to be in the range of 0.06 to 0.3 mg/L.

EXAMPLE 5

The following minilab solutions were treated in a system similar to those described in Example 1 and shown in FIG. 32. A settling filter as shown in FIG. 31 was used to separate the flocculated solids from liquid. The minilab mix comprised: paper process bleach fix, simulated paper process stabilizer, film process fix, and film process stabilizer. Silver content of this mixture was 2.5-3.0 g/L. The flow rates were: 5 ml/min of TMT-15, 20 ml/minute of a 400 PPM solution of Calgon 2406 cationic polymer, and 200 ml/min of silver bearing solution. Filter utilization was excellent, with over 100 gallons (379 L) of solution treated before pressure build up signaled the need for a filter change. Silver removal was excellent for this experiment, which was repeated numerous times to prove reliability. Total silver in effluent ranged from 0.2 to 0.96 mg/L.

Figure 33:
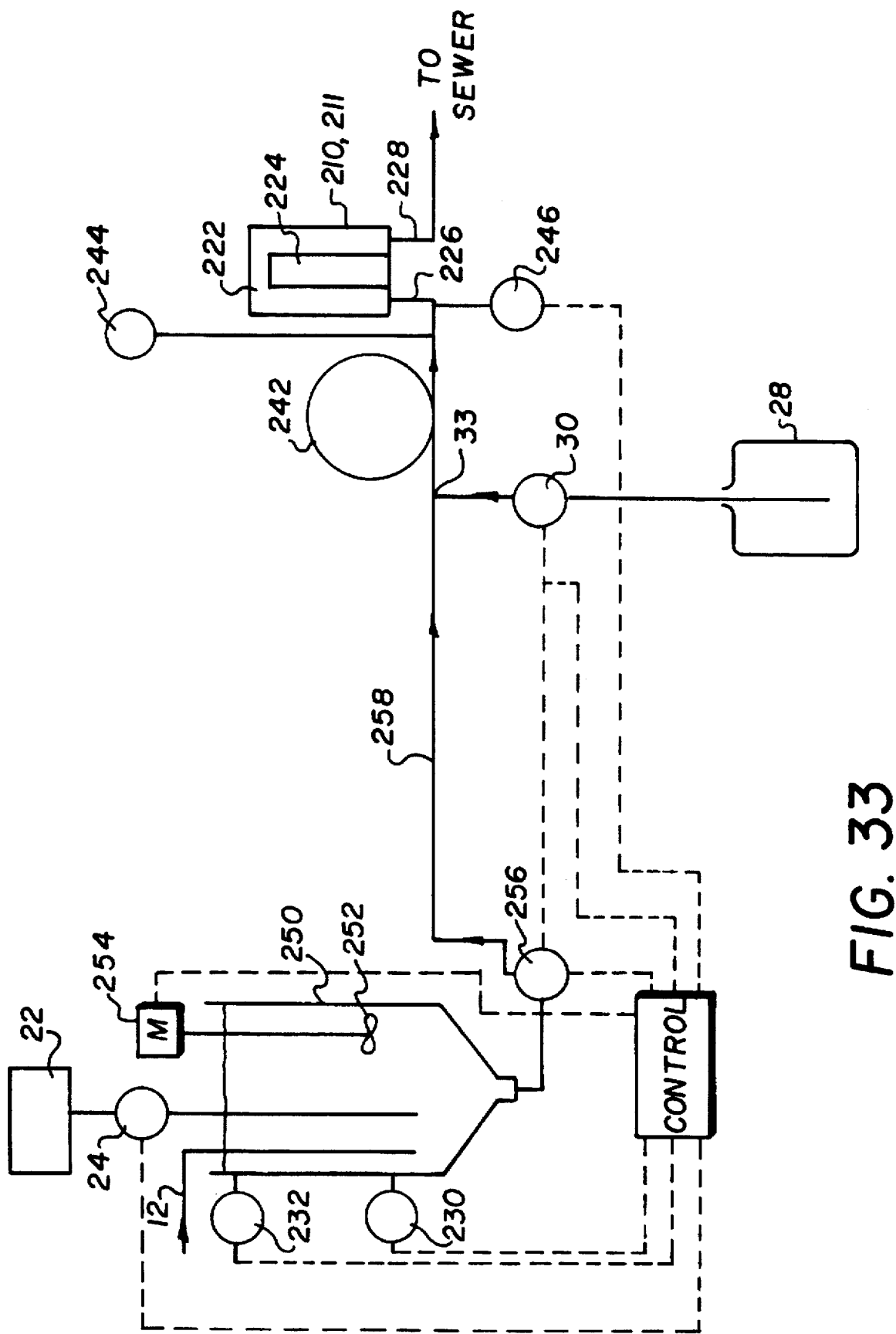
FIG. 33 illustrates schematically an apparatus for removing silver from spent photo-processing solution in accordance with the invention, in which the spent solution and precipitating agent are combined in a mixing vessel and the mixture is pumped into a reaction conduit where flocculating agent is added.

FIG. 33 illustrates an alternative embodiment of the invention in which the spent solutions from conduit 12 and the appropriate amount of precipitating agent from source 22 are combined in a mixing vessel 250 using a propeller mixer 252 driven by a motor 254. A pump 256 delivers a mixture of liquid and precipitate along a conduit 258 to a point at which flocculating agent is delivered from source 28 upstream of conditioning coil 242. Otherwise, this embodiment is much the same as that of FIG. 32.

EXAMPLE 6

Five gallons (18.93 L) of minilab solutions were treated after primary electrolytic silver recovery: paper process bleach-fix, paper process stabilizer, film process fix, and film process stabilizer. The silver content after electrolytic silver recovery was measured at 220 mg/L. The solution was treated in the apparatus of FIG. 33. The TMT-15 precipitating agent (25 ml) was added in proportion to the silver in solution, with continuous mixing in the reaction tank. A low molecular weight, cationic polymer, Calgon E-2280, made up at 400 mg/L in water, was injected at 20 ml/min. Silver removal from solution was good with this arrangement, but the pleated paper filter element 220 in the settling vessel blinded more quickly than expected. Although the effluents from this system were within regulatory limits for silver, the system would have been somewhat more expensive to operate due likely need to replace filters more frequently. The flocculated solids were granular, with some fines passing through the conduit 18. Evidence of this was a yellow color on the wetted filter element parts, and an increasing liquid level inside the settling filter. Filter capacity was not determined for this mix of solutions.

EXAMPLE 7

A simulated combined minilab effluent containing paper process bleach-fix, paper process stabilizer, film process fix, and film process stabilizer, containing 2.5 to 3.0 g/L silver was used as the feed solution in the apparatus shown in FIG. 33. There were 2 reactors in this case. One reactor was tank 250 in which 400 ml of TMT-15 were added by pump 24 to 5 gallons (18.93 L) of the silver-bearing solution with good mixing provided by a laboratory-scale propeller mixer 254 mounted on the top of the reactor. The mixer speed was held at 100-200 rpm for the duration of the run. After 5-10 minutes reaction time, this slurry was introduced into a conduit 258 using a bellows pump 256 at 200 ml/minute. A 400 mg/L solution of Calgon Flocculant Product No. POL-E-Z-2406 was injected into conduit 258 using bellows pump 30 through a T-fitting sized to produce turbulence at the point of injection. From there, the slurry was carried into conditioning coil 242, which was made from approximately 30 feet (91.44 m) of 0.5 inch (12.7 mm) nominal diameter flexible polyvinyl chloride tubing wrapped around a plastic cylinder approximately 12 inches (305 mm) in diameter. Flow was directed up the spiral in order to displace air bubbles and cause precipitated fines to encounter the growing or ripening clumps of flocculated solids. From coil 242 the slurry was directed to the settling vessel of FIG. 30. Clarified filtrate was directed to the drain from the settling vessel. Filter capacity was determined by monitoring the pressure gage 244 built into the system. Total (soluble plus insoluble) silver levels leaving the settling filter were analyzed at 0.3 to 0.7 mg/L using atomic absorption silver analyses. More than thirty-five, five-gallon (18.93 L) batches of silver-bearing solution as described above were treated in this apparatus before the back pressure in the settling filter reached 10-12 psig (68.9-82.7 kPa), indicating the need to change filters.

EXAMPLE 8

The following minilab solutions were treated in a system similar to those described in Example 1 and shown in FIG. 32. A settling filter as shown in FIG. 31 was used to separate the flocculated solids from liquid. The minilab mix comprised: KODAK Process RA-4 bleach fix plus low flow wash which had been electrolytically desilvered. Silver content of this mixture was 180 mg/L. TMT-15 solution was diluted 1:10 with water. The flow rates were: 5 ml/min of diluted TMT-15, 20 ml/minute of a 400 mg/L solution of Calgon 2280 cationic polymer, and 200 ml/min of the silver bearing solution. Although the flocculated precipitate demonstrated a sandy or grainy appearance, there were no noticeable fines. Settling and subsequent filtration in the filter of FIG. 31 appeared normal. Silver analysis by atomic absorption of the filtrate was in the range of 0.6 to 0.9 mg/L.

Figure 34:
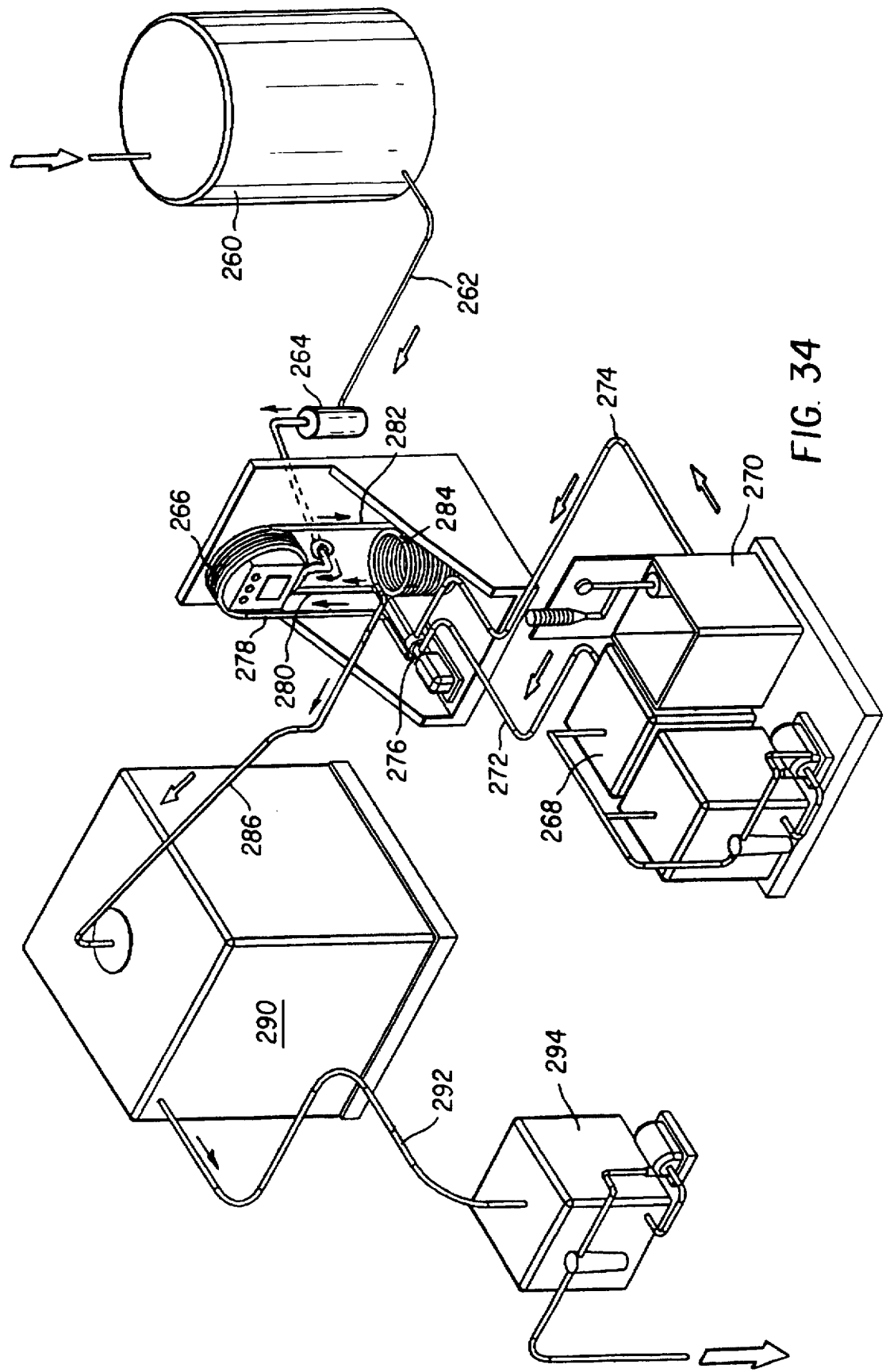
FIG. 34 illustrates schematically a large-scale apparatus in accordance with the invention, in which the reaction conduit is divided into an initial coiled section having an essentially horizontal axis and, beneath the initial section, a final coiled section having an essentially vertical axis.

FIG. 34 illustrates a large scale apparatus according to the invention. A collection tank 260, which for example may have a capacity of about 1,000 to 1,200 liters of spent photoprocessing solution, drains through a conduit 262 to a pump 264 which delivers the solution to an inlet end of an initial mixing conduit formed into a coil 266 having an essentially horizontal axis. For example, tubing with an internal diameter of 25.4 mm and a length of about 2 to 4 meters is suitable for coil 266 for flow rates of 1 to 3 L/min. A tank 268 of precipitating agent and a tank 270 of flocculating agent drain through respective conduits 272, 274 to a multi-head pump 276. Precipitating agent is delivered from pump 276 into a conduit 278 which empties into a downwardly flowing portion of coil 266 in the manner previously described. Flocculating agent is delivered from pump 276 through conduit 280 which empties into a downward flowing conduit 282 which delivers the mixture from coil 266 to an inlet at the bottom of a second conditioning conduit formed into a coil 284 having an essentially vertical axis. For example, tubing with an internal diameter of 25.4 mm and a length of about 10 to 12 meters is suitable for coil 284. The mixture flows upward through coil 284 and exits the coil into a conduit 286 which empties into a large collecting and shipping vessel 290, which for example may have a volume of about 1,000 to 1,200 liters. Preferably, conduit 286 extends to the bottom of vessel 290, for reasons previously discussed. Liquid flowing from near the top of vessel 290 passes along a conduit 292 to a final filter 294. The apparatus operates in essentially the same manner of that of FIG. 1, for example.

Apparatus of the types described in this specification have been shown to be effective for removing silver from spent photographic processing solutions having silver concentrations in a range of 180 mg/L to 8 gm/L, preferably about 2 to 4 gm/L. Removal was best in flow regimes having $N_{Re}$ as high as about 4,000, corresponding to spent solution flow rates in a range of about 25 to 8,000 ml/min. Beyond $N_{Re}$ of about 4,000, formation of large, porous clumps of precipitate in the manner previously described, was not observed; an abundance of fines was observed in the discharge from the apparatus; and final silver content exceeded the regulatory requirements previously mentioned. For $N_{Re}$ beyond about 4,000, any large clumps which might form momentarily would be expected to break up quickly into small particles, due to the high flow rates. Preferably, the pH of the solution was in the range of 4 to 12; and the temperature was in a range of 0 to 71 degrees Celsius. Conduit sizes in a range of 6.4 to 63.5 mm internal diameter were effective to ensure formation of porous clumps which essentially filled the cross sectional area of the conduit, in the flow regimes just described. When conduit 18 was formed into a spiral coil, 6.4 to 12.7 mm internal diameter conduit was effective for coils with a coil diameter of about 152.4 mm, while 25.4 mm internal diameter conduit worked well with a coil diameter of about 305 mm or greater. Silver content of the discharge from the apparatus according to the invention was in a range of 1.4 to 8.6 mg/L, well below the regulatory requirements.

Those skilled in the art will appreciate from the foregoing description and examples that the apparatus and methods of our invention may be used to remove metals other than silver from other industrial spent solutions such as electroplating solutions, metal etching solutions and the like. For example, a rinse water from a catalyst-making process containing 200 mg/L of nickel was treated in an apparatus of the type shown in FIG. 33 by adding sodium hydroxide as a precipitating agent and Calgon POL-E-Z-2406 as a flocculating agent. Clumps of agglomerated particles of flocculated precipitate were readily formed and collected. Those skilled in the art will further appreciate that the apparatus and method of our invention can be used readily to remove other metal species (such as iron, copper, cadmium, lead, mercury, chromium, barium and aluminum) by precipitation using known precipitating agents (such as TMT, hydroxides, sulfides, sulfates or organic thiols), by flocculation using known flocculating agents (such as those mentioned in this specification) and by collection in one of our collecting vessels. Persons skilled in the art also will appreciate that the method and apparatus of our invention can be used to remove other, non-metallic species, including organic and inorganic compounds and materials such as hexacyanoferrates, sulfates, sulfides, phosphates, carbonates, photographic coupling agents, sewage sludge micro-organisms and the like, using precipitating agents such as iron, calcium, carbon dioxide or similar agents, followed by an appropriate flocculating agent. Suitable examples of precipitating and flocculating agents are given in the Bober and Cooley article and the Spears and Sentell article previously mentioned, both of which are incorporated by reference into this specification.

The method of removing silver-TMT precipitate from solution using cationic polymers as flocculating agents, such as Product Nos. POL-E-Z-2406 and E-2280 from the Calgon Corporation, is a separate invention of our colleague A. Richard Szembrot, which is implemented by the apparatus and method of our invention.

| Parts List | |
|---|---|
| 10 | apparatus for removing silver |
| 12 | infeed conduit |
| 14 | pump for spent solutions |
| 16 | inlet end of 18 |
| 18 | reaction conduit |
| 20 | check valve |
| 22 | source of precipitating agent |
| 24 | pump for precipitating agent |
| 26 | check valve |
| 27 | inlet to 18 |
| 28 | source of flocculating agent |
| 30 | pump for flocculating agent |
| 32 | check valve |
| 33 | inlet to 18 |
| 34 | motor for 14,24,30 |
| 36 | outlet end of 18 |
| 38 | collecting and shipping vessel |
| 40 | bottom of 38 |
| 44 | top of 38 |
| 46 | closure |
| 48 | downcomer conduit |
| 50 | mass of flocculated solids |
| 52 | separated liquid |
| 54 | check valve |
| 56 | discharge conduit |
| 58 | final filter |
| 60 | straight span |
| 62 | connecting turn |
| 64 | mixing elements |
| 70 | T-fitting |
| 72 | conduit section |
| 74 | conduit section |
| 76 | conduit section |
| 78 | conduit section |
| 80 | connector |
| 82 | sheets of thermoplastic |
| 84 | transition conduit portion |
| 86 | transition conduit portion |
| 88 | smooth conduit portion |
| 90 | cylindrical settling vessel |
| 92 | sloped or concave bottom |
| 94 | bottom outlet from 90 |
| 96 | valve |
| 98 | baffle plate or wall |
| 100 | inlet passage or downcomer |

Parts List

| | |
|---|---|
| 102 | top outlet from 90 |
| 104 | outlet for liquid |
| 106 | conduit |
| 108 | overflow collecting vessel |
| 110 | standpipe or downcomer |
| 112 | span of 110 |
| 114 | extension of 110 |
| 116 | polishing filter |
| 118 | valve |
| 120 | valve |
| 122 | mixing tank |
| 124 | float switch |
| 125 | valve |
| 128 | valve |
| 130 | valve |
| 132 | pump |
| 134 | pail or bucket |
| 136 | closure |
| 138 | inlet conduit |
| 139 | baffle |
| 140 | filter support disk |
| 142 | annular filter element |
| 144 | filter support ring |
| 146 | radial and axial clearance |
| 148 | top outlet |
| 150 | bag filter |
| 152 | top outlet |
| 154 | filter support ring |
| 156 | side outlet |
| 158 | filter cartridge |
| 160 | baffle wall |
| 162 | filter cartridge |
| 164 | central top outlet |
| 166 | filter cartridge |
| 168 | female end of fitting |
| 170 | male end of fitting |
| 172 | standpipe |
| 174 | screw-on cap |
| 176 | open cavity |
| 178 | three-way valve |
| 180 | vent conduit |
| 182 | extension conduit |
| 184 | baffle plate |
| 186 | top outlet |
| 188 | valve |
| 190 | conduit |
| 192 | fitting |
| 194 | outlet conduit |
| 196 | valve actuator |
| 198 | inlet/outlet conduit |
| 200 | divider wall |
| 202 | ball valve |
| 210 | cylinder |
| 211 | shell or housing |
| 212 | top end cap |
| 213a, 213b | domed ends |
| 214 | bottom end cap |
| 216, 218 | central boss |
| 219 | closure plug |
| 220 | filter element |
| 222 | collecting chamber |
| 224 | discharge chamber |
| 226 | inlet to 222 |
| 228 | outlet from 224 |
| 230 | float switch |
| 232 | float switch |
| 242 | conditioning coil |
| 244 | pressure gage |
| 246 | pressure switch |
| 248 | programmable controller |
| 250 | mixing vessel |
| 252 | propeller mixer |
| 254 | motor |
| 256 | pump |
| 260 | collection tank |
| 262 | conduit |
| 264 | pump |
| 266 | initial coil with horizontal axis |
| 268 | tank for precipitating agent |
| 270 | tank for flocculating agent |
| 272 | conduit |
| 274 | conduit |
| 276 | pump |
| 278 | conduit |
| 280 | conduit |
| 282 | down conduit |
| 284 | second coil with vertical axis |
| 286 | conduit |
| 290 | collecting and shipping vessel |
| 292 | conduit |
| 294 | final filter |

While our invention has been shown and described with reference to particular embodiments thereof, those skilled in the art will understand that other variations in form and detail may be made without departing from the scope and spirit of our invention.

Having thus described our invention in sufficient detail to those skilled in the art to make and use it, we claim as new and desire to secure Letters Patent for:

1. A method for removing silver from spent photoprocessing solution, comprising steps of:

providing a mixing vessel;

delivering into the mixing vessel a spent photoprocessing solution containing silver to be removed;

delivering into the mixing vessel a precipitating agent for silver;

mixing the photoprocessing solution and the precipitating agent to form a mixed solution;

defining a mixing path including a conduit having a cross-sectional flow area, an inlet end and an outlet end for receiving and passing the mixed solution from the mixing vessel;

delivering the mixed solution into the inlet end;

delivering into the mixing path a flocculating agent for a silver precipitate formed in the mixed solution;

the outlet end of the mixing path being downstream of the point of delivery of the flocculating agent by a distance, such that a flow rate of the solution through the mixing path, the cross-sectional flow area, and the distance provide a residence time sufficient for forming clumps of flocculated particles of the silver precipitate;

the residence time, the precipitating agent and the flocculating agent being such that clumps of flocculated particles grow and agglomerate during movement of the solution and clumps through the distance into enlarged clumps many of which individually extend across and substantially fill the cross sectional flow area, whereby individual enlarged, moving clumps substantially block passage of and strain from the solution remaining fine particles which then adhere to the enlarged, moving clumps, as the enlarged clumps move to the outlet end; and removing the clumps of flocculated particles from the mixed solution.

2. A method for removing silver from spent photoprocessing solution, comprising steps of:

providing a spent photoprocessing solution containing silver to be removed;

defining a mixing path for receiving and passing the spent photoprocessing solution, the mixing path including a conduit having a cross-sectional flow area, an inlet end, and an outlet end;

delivering the spent photoprocessing solution into the inlet end;

delivering into the mixing path a precipitating agent for silver;

downstream of the point of delivery of the precipitating agent by a first distance providing a first residence time sufficient for mixing of the solution and the precipitating agent and for forming a silver precipitate for flocculation, delivering into the mixing path a flocculating agent for the precipitate;

the outlet end of the mixing path being located downstream of the point of delivery of the flocculating agent by a second distance such that a flow rate of the solution through the mixing path the cross-sectional flow area and the second distance provide a second residence time sufficient for forming clumps of flocculated particles of the silver precipitate;

the second residence time, the precipitating agent and the flocculating agent being such that clumps of flocculated particles grow and agglomerate during movement of the solution and clumps through the second distance into enlarged clumps many of which individually extend across and substantially fill the cross sectional flow area, whereby individual enlarged, moving clumps substantially block passage of and strain from the solution remaining fine particles which then adhere to the enlarged, moving clumps as the enlarged clumps move to the outlet end; and removing the clumps of flocculated particles from the solution.

3. A method according to claim 2, further comprising prior to the removing step, a step of passing the flocculated solids and any remaining liquid from the mixing path into a settling vessel having a sloped bottom wall and a bottom outlet for liquid and flocculated solids.

4. A method according to claim 3, wherein the settling vessel has a cross section and comprises an internal baffle wall extended across a chord of the cross section, the baffle wall having a lower edge near the sloped bottom wall, the mixing path extending into the settling vessel on one side of the baffle wall; and a second outlet for clarified liquid on an opposite side of the baffle wall near an upper end of the settling vessel, whereby liquid and flocculated solids are discharged into the settling vessel near the sloped wall to allow flocculated solids to settle through the bottom outlet and liquid to flow through the outlet of the settling vessel.

5. A method for removing silver from spent photoprocessing solution, comprising steps of:

providing a spent photoprocessing solution containing silver to be removed;

providing a mixing vessel;

delivering the solution into the mixing vessel;

delivering a precipitating agent for silver into the mixing vessel;

delivering into the mixing vessel a flocculating agent for a precipitate formed by mixing the solution and the precipitating agent, whereby flocculated particles are formed by the precipitate and the flocculating agent;

providing a settling vessel for receiving flocculated particles and any remaining liquid from the mixing vessel, the settling vessel having a sloped bottom wall and a bottom outlet for liquid and flocculated particles;

providing an inlet passage within the settling vessel, the inlet passage extending near the bottom wall and having a length providing a residence time sufficient for allowing clumps of flocculated particles to grow and agglomerate during passage through the length;

providing an outlet for clarified liquid near an upper end of the settling vessel;

delivering flocculated particles and liquid from the mixing vessel into the inlet passage;

delivering clumps of flocculated particles and liquid through the bottom outlet from the settling vessel into a first collecting and shipping vessel having an inlet, releasably connected to the bottom outlet of the settling vessel, for receiving the clumps of flocculated particles and any remaining liquid;

permitting the clumps to settle to a bottom of the collecting and shipping vessel and the remaining liquid to move toward an outlet of the collecting and shipping vessel, whereby the settled clumps gradually will fill substantially the collecting and shipping vessel while at least a substantial part of the remaining liquid gradually will pass from the collecting and shipping vessel, thereby permitting a filled collecting and shipping vessel to be disconnected from the bottom outlet of the settling vessel;

removing the first collecting and shipping vessel when it is filled; and connecting a second, empty collecting and shipping vessel to the outlet of the settling vessel.

6. A method according to claim 5, wherein the settling vessel has a cross section and the inlet passage is defined by a baffle wall extended across a chord of the cross section of the settling vessel, the baffle wall having a lower edge near the sloped bottom wall.

7. A method according to claim 5, wherein the outlet of each collecting and shipping vessel is above the bottom of the collecting and shipping vessel; and the clumps of flocculated particles and any remaining liquid flow into each collecting and shipping vessel near the bottom of the collecting and shipping vessel, whereby any remaining liquid flows upward through previously settled solids, thereby removing fines before the liquid reaches the outlet of the collecting and shipping vessel.

8. A method according to claim 5, wherein the clumps of flocculated particles and any remaining liquid flow into each collecting and shipping vessel near the bottom of the collecting and shipping vessel, whereby any remaining liquid must flow upward through previously settled solids, thereby removing fines from the liquid; a tubular filter is positioned within and extended upward from the bottom of each collecting and shipping vessel, the tubular filter having an interior plenum; and the outlet of each collecting and shipping vessel is connected to the interior plenum.

9. A method for collecting and separating flocculated solids and liquid, comprising the steps of:

providing a collecting vessel having an interior and a bottom;

flowing said flocculated solids and liquid into the collecting vessel near the bottom, to allow said flocculated solids to settle, wherein said liquid must flow upwardly through the settled flocculated solids, thereby removing fines from the liquid;

positioning a filter element within the collecting vessel, the filter element dividing the interior into a first, upwardly extended collection chamber for receiving the flow of flocculated solids and liquid and for settling the flocculated solids; and a second, upwardly extended discharge chamber for receiving liquid passed through the filter element, the second chamber having a second bottom;

allowing the flocculated settled solids to agglomerate and compact and to fill substantially the first chamber, so that liquid rising out of said settled solids flows into the second chamber through a fresh portion of the filter element above the settled solids; and flowing the filtered liquid from the second chamber at or near the second bottom.

10. A method according to claim 9, wherein the filter element extends upward from the bottom of the collecting vessel and comprises a tube of pleated paper; and the second chamber is surrounded by the filter element.

11. A method according to claim 9, wherein the filter element comprises a tube of pleated paper and the first chamber is defined within the filter element.

12. A method according to claim 9, wherein the filter element comprises a tube of pleated paper and the second chamber is defined within the filter element.

13. A method for removing silver from spent photoprocessing solution, comprising steps of:

providing a mixing vessel;

providing into the mixing vessel a spent photoprocessing solution containing silver to be removed;

delivering into the mixing vessel a precipitating agent for silver;

defining a mixing path including a conduit having a cross-sectional flow area, an inlet end and an outlet end for receiving and passing mixed solution from the mixing vessel;

delivering the mixed solution into the inlet end;

delivering into the mixing path a flocculating agent for a silver precipitate formed by mixing the solution and the precipitating agent;

the outlet end of the mixing path being downstream of the point of delivery of the flocculating agent by a distance, such that a flow rate of the mixed solution, the cross sectional flow area and the distance provide a residence time sufficient for forming clumps of flocculated particles of the silver precipitate;

the residence time, the precipitating agent and the flocculating agent being such that the clumps of flocculated particles grow and agglomerate during movement of the solution and clumps through the distance into enlarged clumps many of which individually extend across and substantially fill the cross sectional flow area, whereby individual enlarged, moving clumps substantially block passage of and strain from the solution remaining fine particles which then adhere to the enlarged, moving clumps as the enlarged clumps move to the outlet end; and removing the clump of flocculated particles from the solution.

14. A method for removing silver from spent photoprocessing solution, comprising steps of:

combining a solution containing silver to be removed, a precipitating agent for the silver, and a flocculating agent for a silver precipitate formed by the solution and the precipitating agent;

providing a conduit having a length, a cross sectional area, an inlet end and an outlet end;

delivering combined solution at a flow rate into the conduit;

the length of the conduit, the cross sectional area and the flow rate through the conduit being chosen to provide a residence time sufficient for forming large, ripened clumps of flocculated particles of the silver precipitate;

the residence time, the precipitating agent and the flocculating agent being such that the ripened clumps of flocculated particles grow and agglomerate during movement of the solution and clumps through the length into enlarged clumps many of which individually extend across and substantially fill the cross sectional flow area, whereby individual enlarged, moving clumps substantially block passage of and strain from the solution remaining fine particles which then adhere to the enlarged, moving clumps as the enlarged clumps move to the outlet end; and removing the clumps of flocculated article from the solution.

15. A method according to claim 14, wherein a Reynolds number of less than about 4,000 is established in the conduit.

16. A method for removing silver from spent photoprocessing solution, comprising steps of:

providing a mixing vessel;

delivering into the mixing vessel a spent photoprocessing solution containing silver to be removed;

delivering into the mixing vessel a precipitating agent for silver;

mixing the photoprocessing solution and the precipitating agent to form a mixed solution;

defining a mixing path having a cross-sectional flow area, an inlet end and an outlet end for receiving and passing mixed solution from the mixing vessel;

delivering the mixed solution into the inlet end;

delivering into the mixing path a flocculating agent for a silver precipitate formed in the mixed solution;

the outlet end of the mixing path being downstream of the point of delivery of the flocculating agent by a distance, such that a flow rate of the solution through the mixing path, the cross sectional flow area, and the distance provide a residence time sufficient for forming clumps of flocculated particles of the silver precipitate;

the residence time, the precipitating agent and the flocculating agent being such that clumps of flocculated particles grow and agglomerate during movement of the solution and clumps through the distance into enlarged clumps many of which individually extend across and substantially fill the cross sectional flow area, whereby individual enlarged, moving clumps substantially block passage of and strain from the solution remaining fine particles which then adhere to the enlarged moving clumps as the enlarged clumps move to the outlet end;

collecting flocculated solids and any remaining liquid in a collecting and shipping vessel having an inlet, releasably connected to the outlet end of the mixing path, for receiving the flocculated solids and any remaining liquid, for permitting the flocculated solids to settle to a bottom of the collecting and shipping vessel and the remaining liquid to move toward an outlet of the collecting and shipping vessel, whereby the settled flocculated solids gradually will fill substantially the collecting and shipping vessel while at least a substantial part of the remaining liquid gradually will pass from the collecting and shipping vessel, thereby permitting a filled collecting and shipping vessel to be disconnected from the outlet end of the mixing path;

removing the collecting and shipping vessel when it is filed; and connecting an empty collecting and shipping vessel to the outlet of the mixing path.

17. A method according to claim 16, wherein the flocculated solids and any remaining liquid flow into the collecting and shipping vessel near the bottom of the collecting and shipping vessel, whereby any remaining liquid must flow upward through previously settled solids, thereby removing fines from the liquid; a tubular filter is positioned within the collecting and shipping vessel and extended upward from the bottom, the tubular filter having an interior plenum; and the outlet of the collecting and shipping vessel is connected to the interior plenum.

18. A method for removing silver from spent photoprocessing solution, comprising steps of:

providing a spent photoprocessing solution containing silver to be removed;

defining a mixing path for receiving and passing the spent photoprocessing solution, the mixing path having a cross-sectional flow area, an inlet end, and an outlet end;

delivering the spent photoprocessing solution into the inlet end;

delivering into the mixing path a precipitating agent for silver;

downstream of the point of delivery of the precipitating agent by a first distance providing a first residence time sufficient for mixing of the solution and the precipitating agent and for forming a silver precipitate for flocculation, delivering into the mixing path a flocculating agent for the precipitate;

the outlet end of the mixing path being located downstream of the point of delivery of the flocculating agent by a second distance such that a flow rate of the solution through the mixing path, the cross sectional flow area and the second distance provide a second residence time sufficient for forming clumps of flocculated particles of the silver precipitate;

the second residence time, the precipitating agent and the flocculating agent being such that clumps of flocculated particles grow and agglomerate during movement of the solution and clumps through the second distance into enlarged dumps many of which individually extend across and substantially fill the cross sectional flow area, whereby individual enlarged, moving clumps substantially block passage of and strain from the solution remaining fine particles which then adhere to the enlarged, moving clumps as the enlarged clumps move to the outlet end; and collecting flocculated solids and any remaining liquid in a first collecting and shipping vessel having an inlet, releasably connected to the outlet end of the mixing path, for receiving the flocculated solids and any remaining liquid, for permitting the flocculated solids to settle to a bottom of the first vessel and the remaining liquid to move toward an outlet of the first vessel, whereby the settled flocculated solids gradually will fall substantially the first vessel while at least a substantial part of the remaining liquid gradually will pass from the first vessel, thereby permitting a filled first vessel to be disconnected from the outlet end of the mixing path;

removing the first vessel when it is filled; and connecting a second, empty collecting and shipping vessel to the outlet of the mixing path.

19. A method according to claim 18, wherein the outlet of the collecting and shipping vessel is above the bottom of the vessel; and the flocculated solids and any remaining liquid flow into the vessel near the bottom of the vessel, whereby any remaining liquid flows upward through previously settled solids, thereby removing fines before the liquid reaches the outlet of the vessel.

20. A method according to claim 18, wherein the flocculated solids and any remaining liquid flow into the collecting and shipping vessel near the bottom of the vessel, whereby any remaining liquid must flow upward through previously settled solids, thereby removing fines from the liquid; a tubular filter is positioned within the vessel and extended upward from the bottom, the tubular filter having an interior plenum; and the outlet of the vessel is connected to the interior plenum.

21. A method for removing silver from spent photoprocessing solution, comprising steps of:

providing a mixing vessel;

providing into the mixing vessel a spent photoprocessing solution containing silver to be removed;

delivering into the mixing vessel a precipitating agent for silver;

defining a mixing path having a cross-sectional flow area, an inlet end and an outlet end for receiving and passing mixed solution from the mixing vessel;

delivering the mixed solution into the inlet end;

delivering into the mixing path a flocculating agent for a silver precipitate formed by mixing the solution and the precipitating agent;

the outlet end of the mixing path being downstream of the point of delivery of the flocculating agent by a distance, such that a flow rate of the mixed solution, the cross sectional flow area, and the distance provide a residence time sufficient for forming clumps of flocculated particles of the silver precipitate;

the residence time, the precipitating agent and the flocculating agent being such that the clumps of flocculated particles grow and agglomerate during movement of the solution and clumps through the distance into enlarged clumps many of which individually extend across and substantially fall the cross sectional flow area, whereby individual enlarged, moving clumps substantially block passage of and strain from the solution remaining fine particles which then adhere to the enlarged, moving clumps as the enlarged clumps move to the outlet end; and collecting flocculated solids and any remaining liquid in a collecting and shipping vessel having an inlet, releasably connected to the outlet end of the mixing path, for receiving the flocculated solids and any remaining liquid, for permitting the flocculated solids to settle to a bottom of the collecting and shipping vessel and the remaining liquid to move toward an outlet of the collecting and shipping vessel, whereby the settled flocculated solids gradually will fill substantially the collecting and shipping vessel while at least a substantial part of the remaining liquid gradually will pass from the collecting and shipping vessel, thereby permitting a filled collecting and shipping vessel to be disconnected from the outlet end of the mixing path;

removing the collecting and shipping vessel when it is filled; and connecting an empty collecting and shipping vessel to the outlet of the mixing path.

22. A method according to claim 21, wherein the flocculated solids and any remaining liquid flow into the collecting and shipping vessel near the bottom of the collecting and shipping vessel, whereby any remaining liquid must flow upward through previously settled solids, thereby removing fines from the liquid; a tubular filter is positioned within the collecting and shipping vessel and extended upward from the bottom, the tubular filter having an interior plenum; and the outlet of the collecting and shipping vessel is connected to the interior plenum.

* * * * *